United States Patent
Matyjaszewski et al.

(10) Patent No.: US 12,065,519 B2
(45) Date of Patent: Aug. 20, 2024

(54) SYNTHESIS OF POLYMER UNDER CONDITIONS OF ENHANCED CATALYZED RADICAL TERMINATION

(71) Applicant: CARNEGIE MELLON UNIVERSITY, Pittsburgh, PA (US)

(72) Inventors: Krzysztof Matyjaszewski, Pittsburgh, PA (US); Guojun Xie, Newark, DE (US); Michael R. Martinez, Millbrae, CA (US); Thomas G. Ribelli, State College, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 822 days.

(21) Appl. No.: 17/059,806

(22) PCT Filed: Jun. 1, 2019

(86) PCT No.: PCT/US2019/035090
§ 371 (c)(1),
(2) Date: Nov. 30, 2020

(87) PCT Pub. No.: WO2019/232500
PCT Pub. Date: Dec. 5, 2019

(65) Prior Publication Data
US 2021/0309783 A1    Oct. 7, 2021

Related U.S. Application Data

(60) Provisional application No. 62/763,160, filed on Jun. 1, 2018.

(51) Int. Cl.
| | | |
|---|---|---|
| C08F 2/46 | (2006.01) | |
| C08F 2/48 | (2006.01) | |
| C08F 2/50 | (2006.01) | |
| C08F 293/00 | (2006.01) | |
| C08G 61/04 | (2006.01) | |

(52) U.S. Cl.
CPC ............ *C08F 2/48* (2013.01); *C08F 293/005* (2013.01); *C08F 2438/01* (2013.01); *C08F 2810/20* (2013.01)

(58) Field of Classification Search
CPC ...... C08F 265/06; C08F 293/005; C08F 2/48; C08F 220/1804; C08F 2810/20; C08F 2438/01
USPC ................. 522/63, 6, 189, 184, 71, 1; 520/1
See application file for complete search history.

(56) References Cited

U.S. PATENT DOCUMENTS

| | | | |
|---|---|---|---|
| 5,470,928 A | 11/1995 | Harwood | |
| 8,445,610 B2 | 5/2013 | Kwak | |
| 9,862,789 B2 | 1/2018 | Asandei | |
| 2011/0218306 A1* | 9/2011 | Matyjaszewski | ..... C08F 265/04 526/89 |

FOREIGN PATENT DOCUMENTS

| | | | | |
|---|---|---|---|---|
| WO | WO-2015003137 A1 | * | 1/2015 | ............... C08F 2/38 |
| WO | WO2019232500 A | | 12/2019 | |

OTHER PUBLICATIONS

Wang et al, Improving the "Livingness" of ATRP by reducing Cu Catalyst Concentration, Feb. 1, 2013, Macromolecules 2013, 46, 683-691 (Year: 2013).*
Ribelli et al, Effect of Ligand Structure on CuII—R OMRP Dormant species and its consequences for catalytic radical termionation in ATRP, Oct. 6, 2016, Macromolecules, 49, 7749-7757 (Year: 2016).*
Boyer, Cyrille et al., Copper-Mediated Living Radical Polymerization (Atom Transfer Radical Polymerization and Copper(O) Mediated Polymerization): From Fundamentals to Bioapplications; Chem. Rev.; 2016;116; 1803-1949.
Johnstone, Robert A. W. et al., Heterogeneous Catalytic Transfer Hydrogenation and Its Relation to Other Methods for Reduction of Organic Compounds; Chem. Rev.; 1985, 85;129-170.
Sheiko S. et al., Cylindrical Molecular Brushes: Synthesis, Characterization, and Properties. Progress in Polymer Science 2008, 33, 759-785.
Sheiko, S.S.; Moller, M. Visualization of Macromolecules—A First Step to Manipulation and Controlled Response. Chemical Reviews 2001, 101, 4099-4123.
Cho, H. Y. el al., Synthesis of Poly(OEOMA) Using Macromonomers Via "Grafting-through" ATRP. Macromolecules 2015, 48, 6385-6395.
Beers, K. L.et.al., The Synthesis of Densely Grafted Copolymers by Atom Transfer Radical Polymerization. Macromolecules 1998, 31, 9413-9415.
Burdynska, J., et al., Molecular Bottlebrushes with Bimodal Length Distribution of Side Chains. Macromolecules 2015, 48, 4813-4822.
Matyjaszewski, K., Mechanistic Aspects of Atom transfer Radical polymerization, ACS Symposium Series 1998, 685, 258-283.
T. G. Ribelli, et al., Effect of Ligand Structure on the Cu-R OMRP Dormant Species and its Consequences for Catalytic Radical termination in ATRP, Macromol. 2016, 49, 7749-7757.
T. G. Ribelli et. al. Disproportionation or Combination? The Termination of Acrylate Radicals in ATRP, Macromol. 2017, 50, 7920-7929.
Lorandi, F. et al., New Protocol to Determine the Equilibrium Constant of Atom Transfer Radical Polymerization. Electrochimica Acta 2018, 260,648-655.
Paturej, J. et al., Molecular Structure of Bottlebrush Polymers in Melts. Science Advances 2016, 2, e1601478,1-12.
X. Pan, et al.; Photomediated Controlled Radical Polymerization, Prog. Poly. Sci. 2016, 62, 73-125.
A. J. Teator, et al; Switchable Polymerization Catalysts, Chem. Rev. 2016, 116, 1969-1992.
G. Xie, et al, Preparation of Titania Nanoparticles with Tunable Anisotropy and Branched Structures from core-shell Molecular Bottlebrushes, Polymer 2016, 98, 481-486.
Asua, J.M., et al, Critically Evaluated Rate Coefficients for Free-Radical Polymerization, 5a,b Propagation Rate Coefficient for Butyl Acrylate, Macromolecular Chemistry and Physics 2004, 205, 2151-2160.

(Continued)

*Primary Examiner* — Jessica Whiteley
(74) *Attorney, Agent, or Firm* — BARTONY & ASSOCIATES LLC

(57) ABSTRACT

A method of carrying out an atom transfer radical polymerization wherein intermolecular crosslinking can occur includes controlling an amount of crosslinking by carrying out the reaction under conditions wherein catalytic radical termination is favored over radical termination.

21 Claims, 18 Drawing Sheets

(56) References Cited

OTHER PUBLICATIONS

W. F. M. Daniel, et al., Solvent-free, Supersoft and Superelastic Bottlebrush Melts and Networks, Nat. Mater 2016, 15, 183-190.

M. Destarac, et al., Polychloroalkanes as ATRP Initiators: Fundamentals and Application to the Synthesis of Block Copolymers from the Combination of Conventional Radical Polymerization and ATRP, ACS Symposium Series 2000, 768, 234-247.

D. Konkolewicz, et al., Tuning Polymer Properties through Competitive Processes, ACS Symposium Series 2012, 1100, 145-169.

Neugebauer, D. et al., PDMS-PEO Densely Grafted Copolymers. Macromolecules 2005, 38, 8687-8693.

Fischer, H. The Persistent Radical Effect: A Principle for Selective Radical Reactions and Living Radical Polymerizations. Chemical reviews 2001, 101, 3581-3610.

A. Kaur, et al, Properties and ATRP Activity of Copper Complexes with Substituted Tris(2-pyridylmethyl)amine-Based Ligands; Inorganic Chemistry 2015, 54, 1474-1486.

K. Matyjaszewski, J. Xia, Atom Transfer Radical Polymerization, Chem. Rev. 2001, 101, 2921-2990.

Matyjaszewski, K. Atom Transfer Radical Polymerization (TRP): Current Status and Future Perspectives, Macromolecules 2012, 45, 4015-4039.

K. Matyjaszewski, Comparison and Classification of Controlled/Living Radical Polymerizations, ACS Symposium Series 2000, 768, 2-26.

K. Matyjaszewski, Controlled/Living Radical Polymerization: State of the Art in 2002, ACS Symposium Series 2003, 854, 2-9.

K. Matyjaszewski, Controlled Radical Polymerization: State of the Art in 2008, ACS Symposium Series 2009, 1023, 3-13.

K. Matyjaszewski, et al, The Preparation of Well-Defined Water Soluble-Swellable (Co)Polymers by Atom Transfer Radical Polymerization, ACS Symposium Series 2000, 765, 52-71.

K. Min, et al, High Yield Synthesis of Molecular Brushes via ATRP in Miniemulsion, Macromol. 2007, 40, 6557-6563.

T. G. Ribelli, et al, Synthesis and Characterization of the Most Active Cooper ATRP Catalyst Based on Tris[(4-dimehtylaminopyridyl)methyl]amine, J. Am. Chem.Soc.2018,140, 1525-1534.

W. Tang, K. Matyjaszewski, Effect of Ligand Structure on Activation Rate Constants in ATRP, Macromol. 2006, 39, 4953-4959.

W. Tang, et. al, Understanding Atom Transfer Radical Polymerization: Effect of Ligand and Initiator Structures on the Equilibrium Constants, J. Am. Chem. Soc. 2008, 130, 10702-10713.

N. V. Tsarevsky, K. Matyjaszewski, "Green" Atom Transfer Radical Polymerization: From Process Design to Preparation of Well-Defined Environmentally Friendly Polymeric Materials, Chemical Reviews 2007, 107, 2270-2299.

W. A. Braunecker, K. Matyjaszewski, Controlled/Living radical Polymerization: Features, developments, and perspectives, Progress in Polymer Science 2007, 32, 93-146.

Y. Wang, et. al., Improving the "Livingness" of ATRP by Reducing Cu Catalyst Concentration, Macromol, 2013, 46, 683-691.

K. Matyjaszewski, Bulk Atom Transfer Radical Polymerization, ACS Symposium Series 1998 ,713, 96-112.

Gao, Haifeng and K. Matyjaszewski, Synthesis of Molecular Brushes by "Grafting onto" Method: Combination of ATRP and Click Reactions, J. Am. Chem. Soc. 2007, 129, 6633-6639.

Matyjaszewski, K., et al., Organic-Inorganic Hybrid Polymers from Atom Transfer Radical Polymerization and Poly (dimethylsiloxane), ACS Symp. Ser. 2000, 729, 270-283.

* cited by examiner a) ATRP equilibrium b) Radical termination (RT)

c) Catalytic radical termination (CRT)

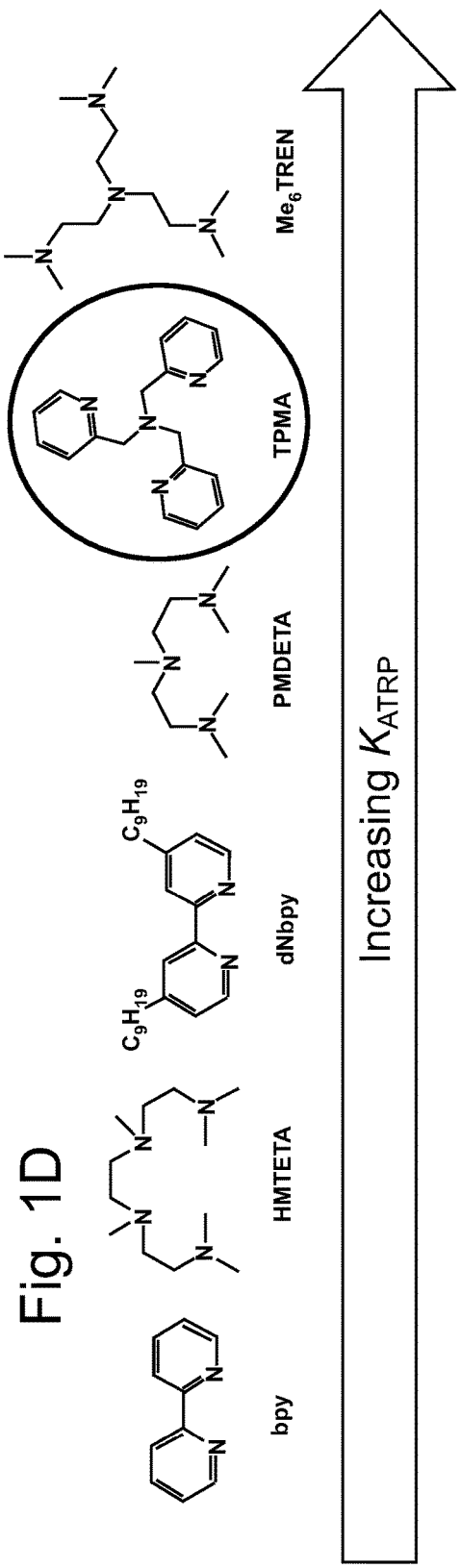
Fig. 1D
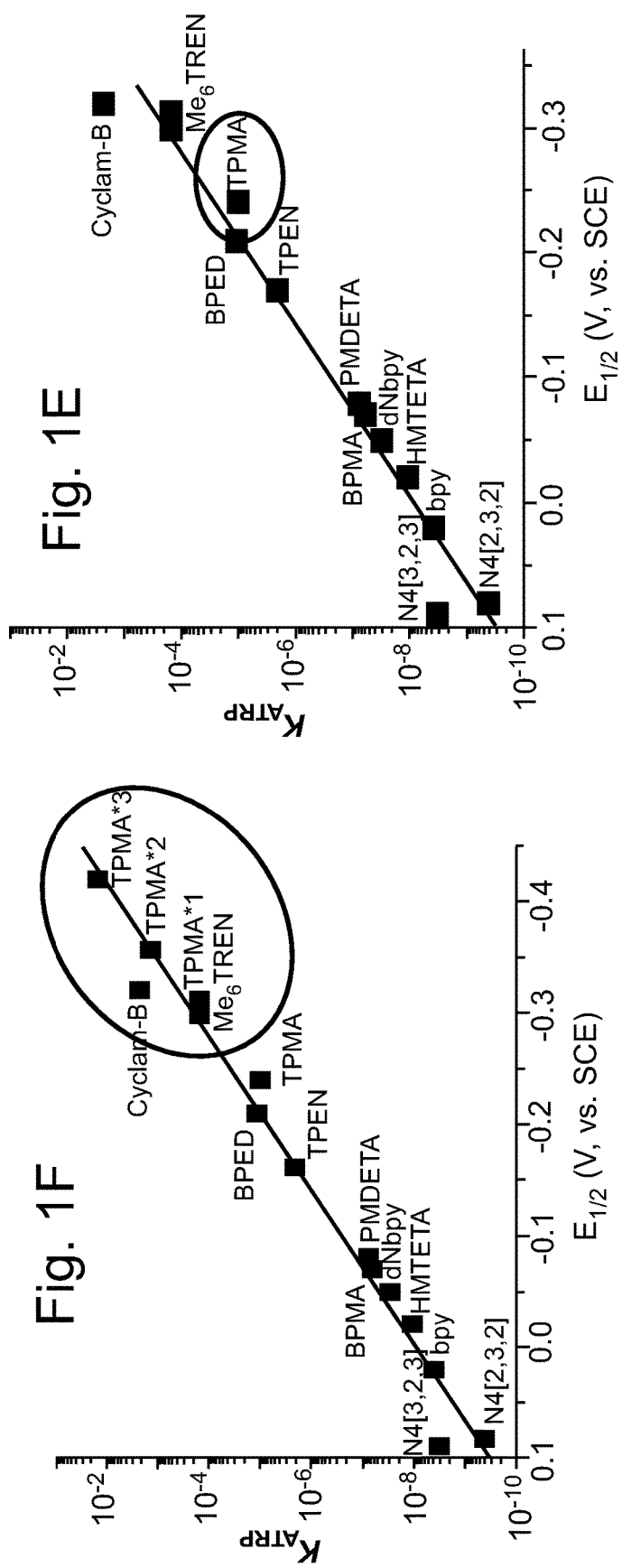
Fig. 1E
Fig. 1F

SYNTHESIS OF POLYMER UNDER CONDITIONS OF ENHANCED CATALYZED RADICAL TERMINATION

CROSS-REFERENCE TO RELATED APPLICATIONS

This application is a US National Phase of the International PCT patent application number: PCT/US2019/035090 filed on Jun. 1, 2019, which claims benefit of U.S. Provisional Patent Application Ser. No. 62/763,160, filed Jun. 1, 2018, the disclosures of which are incorporated herein by reference.

GOVERNMENTAL INTEREST

This invention was made with government support under grant nos. DMR1436219 and DMR1501324 awarded by the National Science Foundation. The government has certain rights in this invention.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Molecular bottlebrushes possess polymeric side chains that are densely grafted from a backbone copolymer. The steric interactions between side chains lead to an extended conformation of the backbone, providing macromolecules with a worm-like shape. Molecular bottlebrushes have potential applications as anisotropic nanomaterials, supersoft elastomers, surfactants, photonic materials, lubricants, biolubricants, stimuli-responsive materials, and nano-porous materials.

Three synthetic strategies have been developed for the preparation of molecular bottlebrushes: a) "grafting-onto", that is attaching pre-formed side chains to the backbone, b) "grafting-through", that is, polymerizing macromonomers, and c) "grafting-from", that is growing side chains from a backbone functionalized with distributed initiators. Unlike the first two strategies, "grafting-from" generates more densely grafted side chains from backbones of any desired length, as long as the side chains can be evenly grown with high initiation efficiency from the backbone. To grow uniform side chains, the "grafting from" method is often performed by controlled radical polymerization (CRP) techniques, such as atom transfer radical polymerization (the generally accepted mechanism for which is illustrated as mechanism a of FIG. 1A).

ATRP has been discussed in numerous publications with Matyjaszewski as co-author and reviewed in several book chapters. Matyjaszewski, K. et al. *ACS Symp. Ser.* 1998, 685, 258-283; *ACS Symp. Ser.* 1998, 713, 96-112; *ACS Symp. Ser.* 2000, 729, 270-283; *ACS Symp. Ser.* 2000, 765, 52-71; *ACS Symp. Ser.* 2000, 768, 2-26; *ACS Symposium Series* 2003, 854, 2-9; *ACS Symp. Ser.* 2009, 1023, 3-13; *ACS Symp. Ser.* 2012, 1100, 145-170; *Chem. Rev.* 2001, 101, 2921-2990; *Chem Rev* 2007, 107, 2270-2299 and *Prog. Polym. Sci.*, 2007, 32, 93-146, the disclosures of which are incorporated by reference. Such references provide substantial information on the range of suitable transition metals that can participate in the redox reaction and provide many examples of suitable ligands for the different transition metals to form transition metal complexes suitable for polymerizing a broad range of radically polymerizable (co)monomers. The general formula for such active catalyst complexes is Mt/L, wherein Mt is a transition metal with two stable oxidation states differing by 1, and L is a complexing ligand. Of the transitions metals, copper (Cu) is most often used in forming active catalyst complexes for ATRP. However, a wide range of other metals can be employed in an ATRP including Ti, Mo, Re, Fe, Ru, Os, Rh, Co, Ni, and Pd.

As illustrates in mechanism a of FIG. 1A for the transition metal Cu, in a typical ATRP, a (macro) alkyl halide ($P_n$—X) is activated by a transition metal catalyst complex in lower oxidation state L/$Cu^I$ to generate a higher oxidation state halide complex (L/$Cu^{II}$—X) and a radical ($P_n\cdot$). The radicals propagate, and typically, after a single or several monomer additions, may be deactivated back to reform dormant/non-radical (macro)alkyl halides.

One limitation of "grafting from" is the possibility of gelation arising from intermolecular radical termination (RT), with rate coefficient $k_t$ (see mechanism b illustrated in FIG. 1B). The dominant mode of termination between acrylate radicals is combination of the two radicals ($P_n\cdot$ and $P_m\cdot$, in mechanism b) thereby resulting in inter-bottlebrush coupling. Thus, the multifunctional polymers crosslink and the polymerization mixture forms a gel at relatively low conversions. The resulting networks trap a large fraction of the polymer bottlebrushes, resulting in materials that are difficult to process and inherently unsuited for many applications requiring the properties associated with "free" macromolecules.

To avoid macroscopic gelation during known procedures for synthesis of molecular bottlebrushes via "grafting-from" methods, the reaction is conducted under conditions that provide low monomer conversion in systems highly diluted with monomer or solvent. In one attempt to overcome this limitation, a mini-emulsion was used to prevent macroscopic gelation of molecular bottlebrushes, which were "compartmentalized" inside the droplet boundaries. Although higher monomer conversion was achieved without macroscopic gelation, crosslinking occurred within the latex particles as a result of the unavoidable intermolecular radical termination reactions.

SUMMARY

In one aspect, a method of carrying out an atom transfer radical polymerization wherein intermolecular crosslinking can occur includes controlling (that is, reducing or minimizing) an amount of crosslinking by carrying out the reaction under conditions wherein catalytic radical termination is favored over radical termination. In a number of embodiments, the atom transfer radical polymerization is carried out in the presence of a relatively highly active catalyst complex. The activity of the active catalyst complex may, for example, be maximized. In a number of embodiment, the active catalyst complex has a $K_{ATRP}$ greater than $1.0\times10^{-5}$, a $K_{ATRP}$ of at least $1.5\times10^{-4}$, or a $K_{ATRP}$ of at least $1.0\times10^{-2}$.

The active catalyst complex may, for example, include L/$Mt^z$, wherein Mt is a transition metal with two stable oxidation states differing by 1, that is z and z+1. L is a complexing ligand. The transition metal may, for example, be Cu, Ti, Mo, Re, Fe, Ru, Os, Rh, Co, Ni, and Pd. In a number of embodiments, the transition metal is Cu.

In a number of embodiments, the active catalyst complex is slowly activated and reactivated in the presence of a reducing agent and a hydrogen transfer agent. The concentration of the L/Mt$^z$ complex may, for example be lower than 10% of the higher oxidation state catalyst complex (L/Mt$^{z+1}$—X). In a number of embodiments, the concentration of the L/Mt$^z$ complex is lower than 5% of the higher oxidation state catalyst complex. In a number of embodiments, the reducing agent is light and the atom transfer radical polymerization is a photoATRP. In a number of embodiments, the concentration of the active catalyst complex (in the lower oxidation state) in the reaction medium is lower than 150 ppm. In a number of embodiments, the concentration of the active catalyst complex (in the lower oxidation state) in the reaction medium is less than 25 ppm.

In a number of embodiments, a polymer formed via the atom transfer radical polymerization has a Đ lower than 1.25 and a measured molecular weight within 7.5% of a theoretical molecular weight. The measured molecular weight may, for example, be within 5% of the theoretical molecular weight. Conversion of monomer in the atom transfer radical polymerization may, for example, be greater than 60%, or greater than 80%. The polymerization time to, for example, reach such a conversion may, for example, be less than 30 hours or less than 24 hours. The atom transfer radical polymerization may, for example, be conducted at a temperature less than 80° C. In a number of embodiments, the atom transfer radical polymerization is conducted at a temperature of approximately 25° C. (that is, within 10% of 25° C.).

In a number of embodiments, the concentration of the active catalyst complex is less than 600 ppm, or less than 150 ppm.

In a number of embodiments, the atom transfer radical polymerization is conducted in the presence of at least one additive that undergoes hydrogen atom transfer. The additive may, for example, be a cosolvent or an agent that forms stable radicals.

In a number of embodiments, the atom transfer radical polymerization is used to prepare star macromolecules, graft macromolecules, or bottlebrush macromolecules. In a number of embodiments, the radically polymerizable monomers polymerized in the atom transfer radical polymerization include acrylates.

In another aspect, a method for the synthesis of linear polymers by atom transfer radical polymerization includes conducting the synthesis in the presence of an active catalyst complex including L/Mt$^z$, wherein Mt is a transition metal with two stable oxidation states differing by 1, z and z+1, and L is a ligand, the active catalyst complex having a K$_{ATRP}$ greater than 1.0×10$^5$ and slowly activating and reactivating the active catalyst complex in the presence of a reducing agent, wherein the concentration of L/Mt$^z$ is lower than 10% of the higher oxidation state catalyst complex, and the catalyst concentration in the reaction medium is lower than 150 ppm. In a number of embodiments, the concentration of Mt$^z$/L is lower than 5% of the higher oxidation state catalyst complex. In a number of embodiment, Mt is Cu and z is 1.

The present systems, methods and compositions hereof, along with the attributes and attendant advantages thereof, will best be appreciated and understood in view of the following detailed description taken in conjunction with the accompanying drawings.

BRIEF DESCRIPTION OF THE DRAWINGS

FIG. 1D illustrates a number of ligands for active catalyst complexes in order of increasing K$_{ATRP}$.

FIG. 1E illustrates a plot of K$_{ATRP}$ for a number of ligands for active catalyst complexes including Cu as a function of half wave potential (E$_{1/2}$) versus the saturated calomel electrode (SCE).

FIG. 1F illustrates another plot of K$_{ATRP}$ for a number of ligands for active catalyst complexes including Cu as a function of half wave potential (Eu2) versus the saturated calomel electrode (SCE), demonstrating how activity of Cu$^I$/tris(2-pyridylmethyl)amine (Cu/TPMA) is increased by electron donor substituents (see encircled portions of FIGS. 1E and 1F).

wherein panel (c) illustrates evolution of Cu(II)/L concentration upon irradiation exposure; conditions: [CuBr$_2$]=2.5 mM, [L]=5 mM, in DMF/anisole=1/4 (v/v), irradiation by 360 nm at 4.9 mW/cm$^2$.

Figure 14:
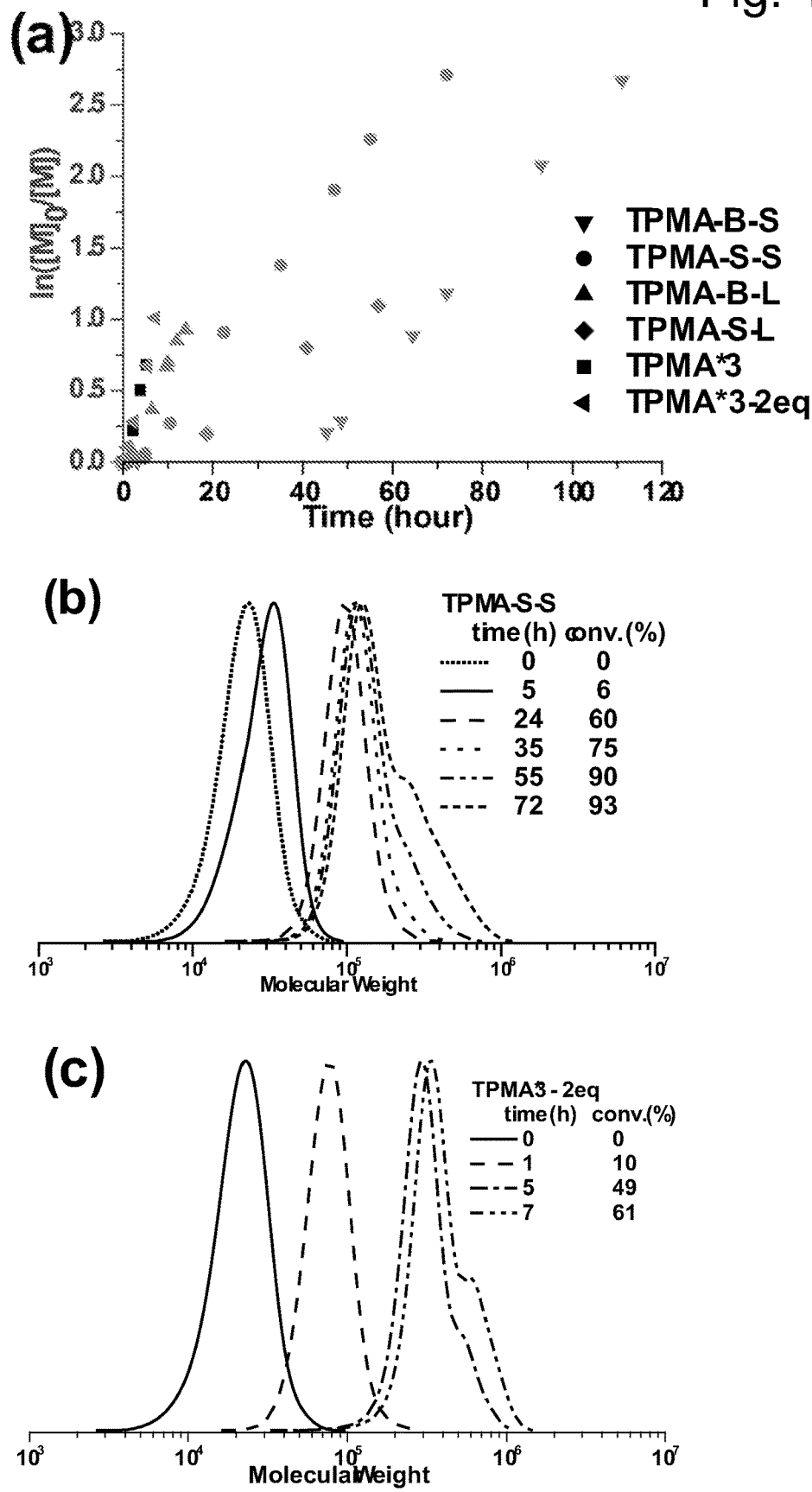

FIG. 14 illustrates (a) Kinetic plots for the polymerization of PBA molecular bottlebrushes. (b, c) GPC traces for the reactions (b) TPMA-B-S, and (c) TPMA*3-2 eq (molecular weight based on linear polystyrene calibration); Condition: [BA]:[BiBEM]:[CuBr$_2$]:[TPMA]=x:1:y:6y (x=200 or 50 for TPMA-S-S and TPMA-B-S; y=6 or 2 for TPMA*3-2 eq), DP of PBiBEM=56 or 370 for TPMA-B-S and TPMA-B-L, 25° C., irradiation: λ=360 nm, energy density=4.9 mW/cm$^2$, 16 vol. % DMF, 64% anisole.

Figure 15:
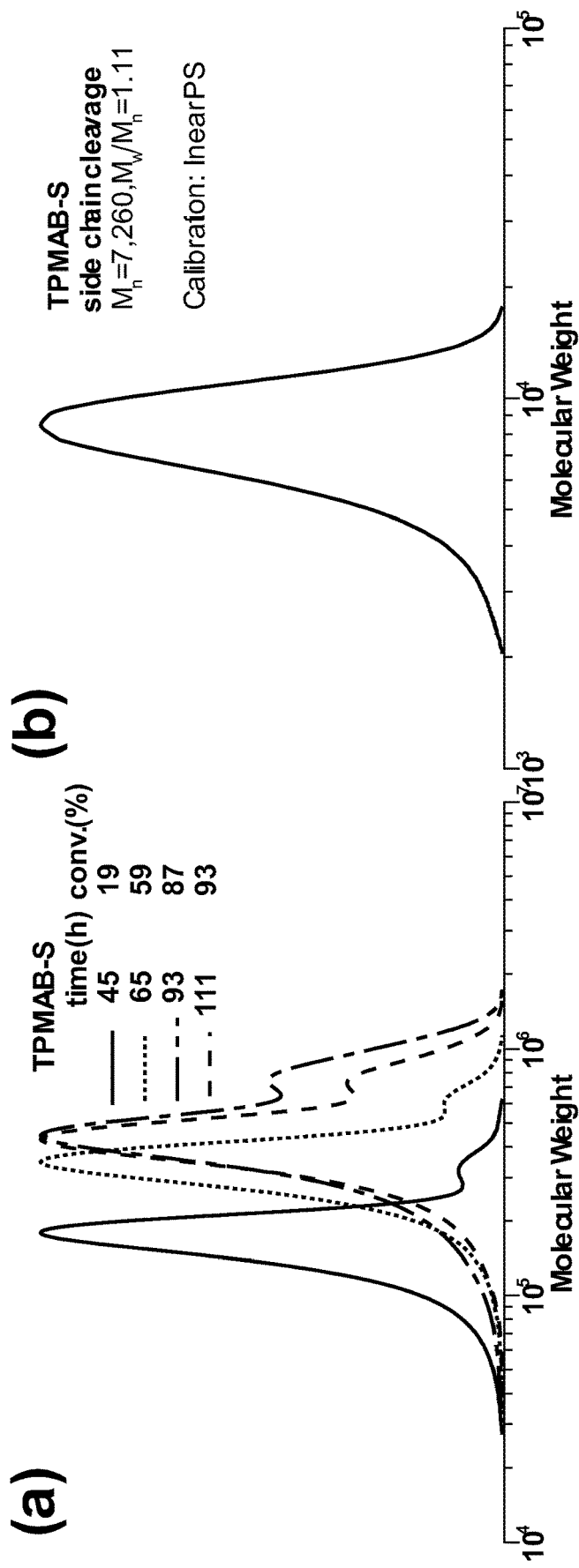

FIG. 15 illustrates (a) GPC trace evolution and (b) GPC trace of side chain cleavage experiment of TPMA-B-S (Table 3).

Figure 16:
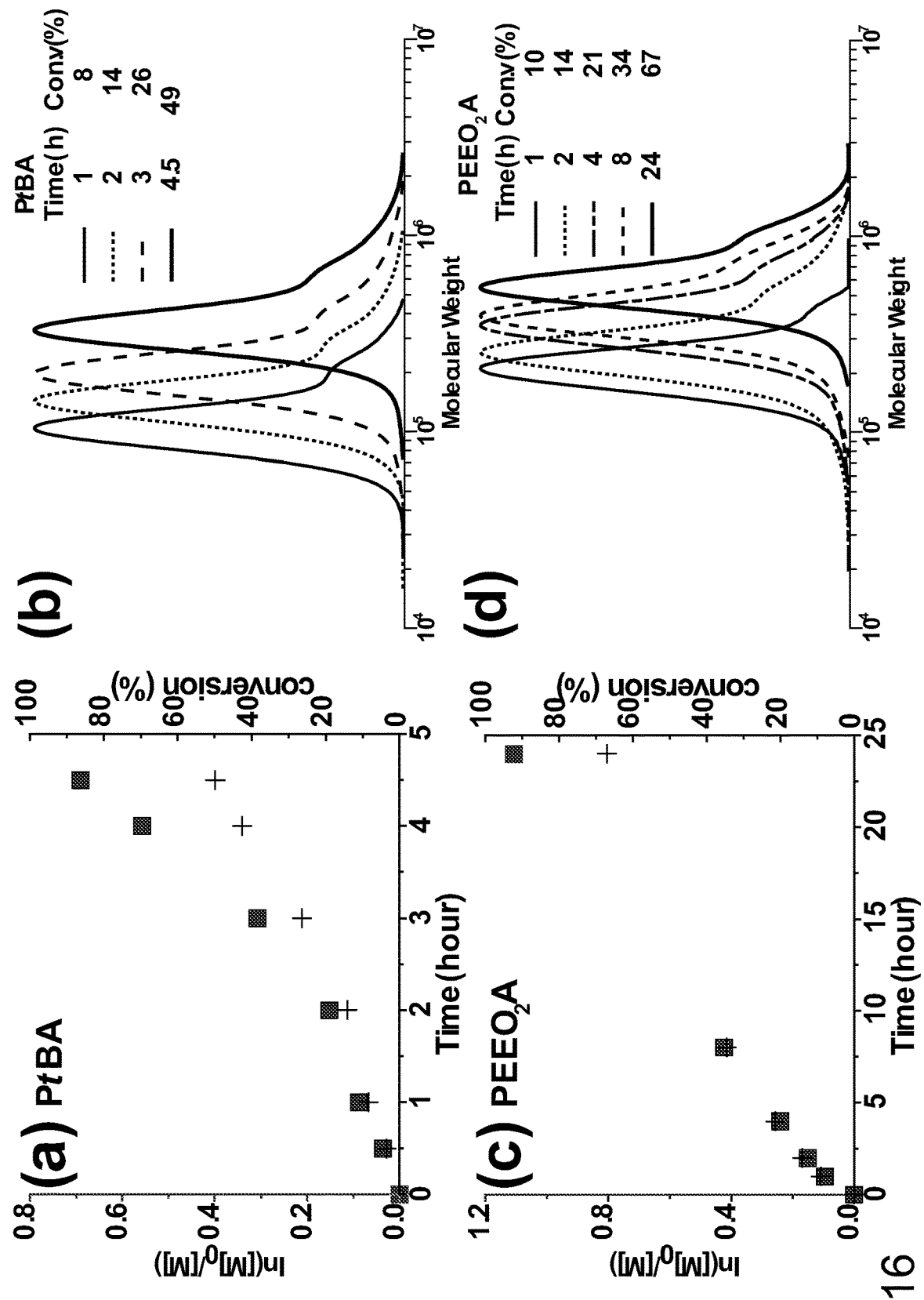

FIG. 16 illustrates preparation of P(BiBEM-g-PtBA$_{49}$) and P(BiBEM-g-PEEO$_2$A$_{34}$) molecular brushes as characterized by kinetic curves (panels a and c) and GPC trace evolutions (panels b and d).

Figure 17:
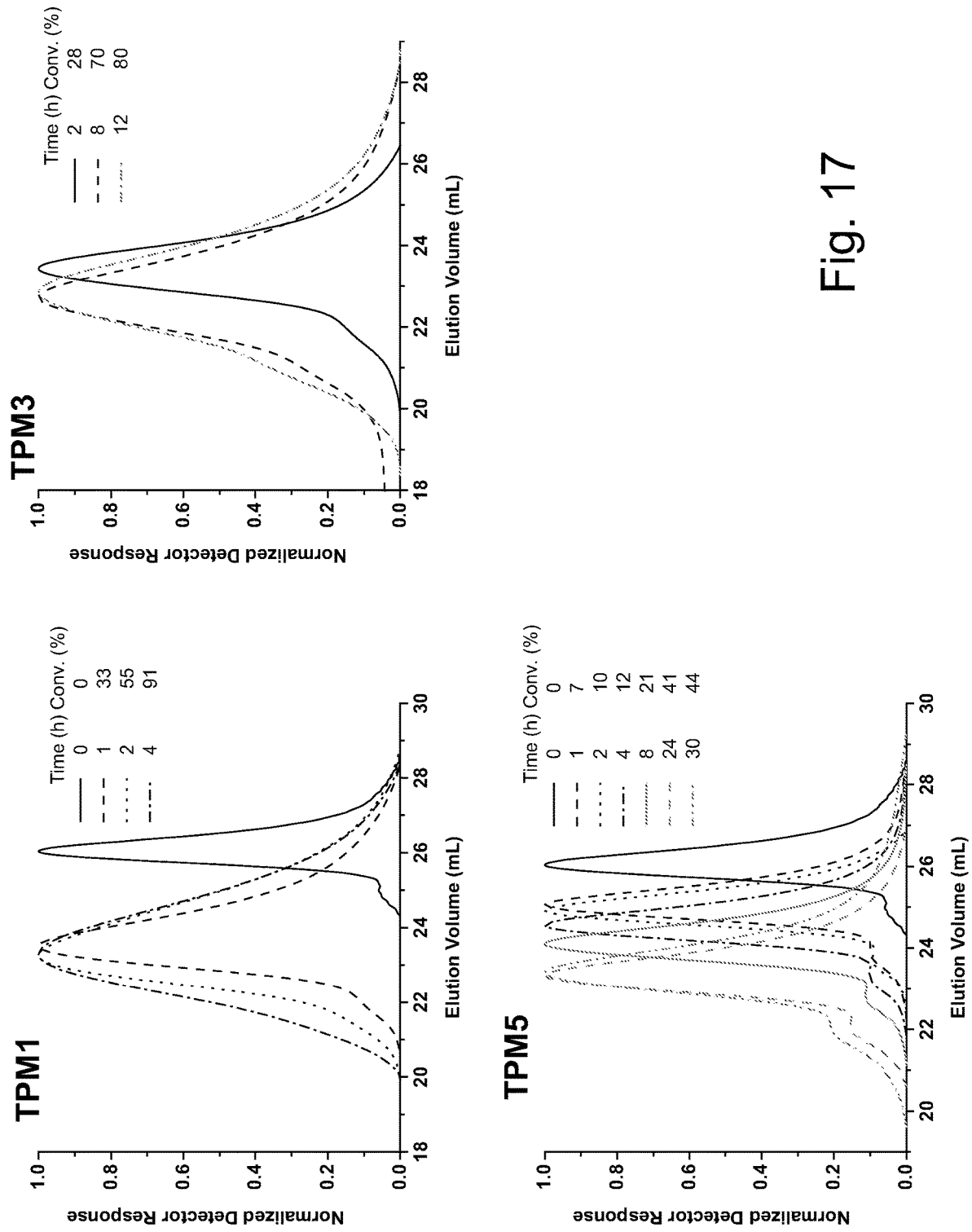

FIG. 17 illustrates (a) the evolution of GPC traces during the reaction of H80TPM, (b) the evolution of GPC traces during the reaction of H80TPM3 and (c) the evolution of GPC traces during the reaction of H80TPM5.

DETAILED DESCRIPTION

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "an additive" includes a plurality of such additives and equivalents thereof known to those skilled in the art, and so forth, and reference to "the additive" is a reference to one or more such additives and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

Systems, methods and compositions hereof allow the synthesis of, for example, representative molecular bottlebrush copolymers in high yield, under conditions that allow rapid, high conversion, of monomers, via a grafting from procedure. Previous grafting from procedures employed reaction conditions that proceeded at a slow rate and targeted a low yield (that is, limited monomer conversion) to prevent inter-brush radical combination resulting in crosslinking and gelation. The systems, methods and compositions hereof allow preparation of industrially desirable brush macromolecules in high yield, above 70% monomer conversion, under scalable conditions. Although molecular bottlebrush copolymers were synthesized in a number of representative examples hereof, the systems, methods and compositions hereof are suitable for use in any ATRP reaction in which intermolecular cross-linking can occur to limit such cross-linking.

Figure 1A:
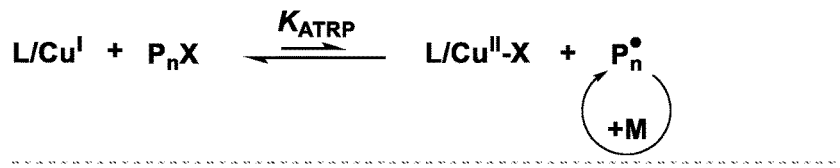
FIG. 1A illustrates (a) a mechanism of ATRP, (b) a mechanism of a conventional radical termination (RT) and (c) a mechanism of catalytic radical termination (CRT) which involves hydrogen atom transfer of labile R—H bonds (such as found in, for example, acetonitrile) to the L/Cu$^{II}$-P$_n$ species, thereby generating a saturated polymeric chain-end, P$_n$—H, and a free radical, R·.
Figure 1A:
Figure 1A:
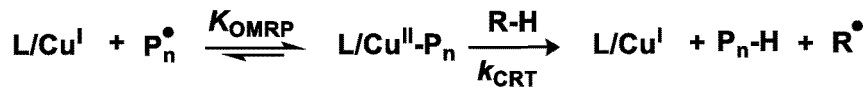

It was recently discovered that in addition to conventional radical termination, acrylate radicals in ATRP can undergo catalytic radical termination (CRT), as shown in mechanism c of FIG. 1A (for a copper/ligand complex). The present inventors have discovered that this "undesirable side-reaction" may be used to limit intermolecular reaction/cross-linking in ATRP reactions in which such cross-linking can occur. CRT proceeds via L/Cu$^{II}$-P$_n$ organometallic intermediates with either other radicals or hydrogen atom donors. The equilibrium between P$_n$· and L/Cu$^{II}$-P$_n$ is defined by the concentration of L/Cu$^I$ species and the equilibrium constant of organometallic mediated radical polymerization, K$_{OMRP}$. It was previously proposed that once the L/Cu$^{II}$-P$_n$ species is formed, it quickly terminates with a second radical, resulting in formation of two separate chains with the same molecular weight as the original polymeric radicals, they do not form one linked molecule. However, in the presence of compounds with transferrable C—H bonds (R—H in mechanism c), such as acetonitrile, a second radical may not be involved. Rather, the L/Cu$^{II}$-P$_n$ species could react with these labile C—H via a hydrogen atom transfer (HAT) reaction to generate a saturated chain-end and a new radical from the transfer agent (for example, ·CH$_2$—CN in the presence of Me-CN). Although Cu is used in a number of representative active catalyst complexes hereof, other transition metals such as Ti, Mo, Re, Fe, Ru, Os, Rh, Co, Ni, and Pd may be used.

The activity of a transition-metal- (for example copper-) based ATRP catalyst is dependent on the ligand selected for formation of the catalyst complex. FIG. 1D illustrates a number of ligands for active catalyst complexes in order of increasing K$_{ATRP}$. FIG. 1E illustrates a plot of K$_{ATRP}$ for a number of ligands for active catalyst complexes including Cu as a function of half wave potential (E$_{1/2}$) versus the saturated calomel electrode (SCE). FIG. 1F illustrates another plot of K$_{ATRP}$ for a number of ligands for active catalyst complexes including Cu as a function of half wave potential (E$_{1/2}$) versus the saturated calomel electrode (SCE) demonstrating how activity of TPMA is increased by electron donor substituents (see encircled portions of FIGS. 1E and 1F).

The relative activity of ligands of different structure is, for example, discussed in *Macromol.* 2006, 39, 4953; *J. Am. Chem. Soc.* 2008, 130, 10702, the disclosures of which are incorporated herein by reference. In general, ATRP equilibrium constants may vary widely and strongly depend on the ligand and initiator structures. Some structure-activity relationships have been developed. For example, the activities of the Cu$^I$/ligand complexes are higher for tetradentate ligands, lower for tridentate ligands, and even lower for bidentate ligands. Complexes with tripodal and bridged ligands (for example, Me$_6$TREN and bridged cyclam) are generally more active than those with corresponding linear ligands. Equilibrium constants are higher for tertiary alkyl halides and lower for primary alkyl halides. Further, the activities of alkyl bromides are several times larger than those of analogous alkyl chlorides. Additionally, equilibrium constants are highest for the nitrile derivatives, followed by those for the benzyl derivatives and the corresponding esters.

Strongly reducing catalysts such as Cu/tris[2-(dimethylamino)ethyl]amine (Me$_6$TREN) ($K_{ATRP}$<1.5×10$^{-4}$) are not only highly active in ATRP as a result of high affinity towards alkyl halides but also have higher affinity towards radicals. This increases $K_{OMRP}$ and consequently promotes the CRT pathway for termination. The more favored CRT has a limitation resulting from a loss of chain functionality but the present inventors have discovered that it could also suppress radical-radical combination which could be beneficial, for example, when multifunctional (macro)initiators are being employed as CRT can prevent gelation, especially in multifunctional systems such as, for example, stars, grafts, or bottlebrushes.

high grafting density (>85%) and worm-like structures of the formed bottlebrush products including side chains displaying low polydispersity or Đ. Indeed, CRT was found to be enhanced by conducting the reaction at a lower temperature in the presence of more copper, complexed with a ligand that forms a more active catalyst, with acetonitrile solvent preferred over DMF solvent and in the presence of a larger fraction of the HAT agent MeCN.

Figure 1B:
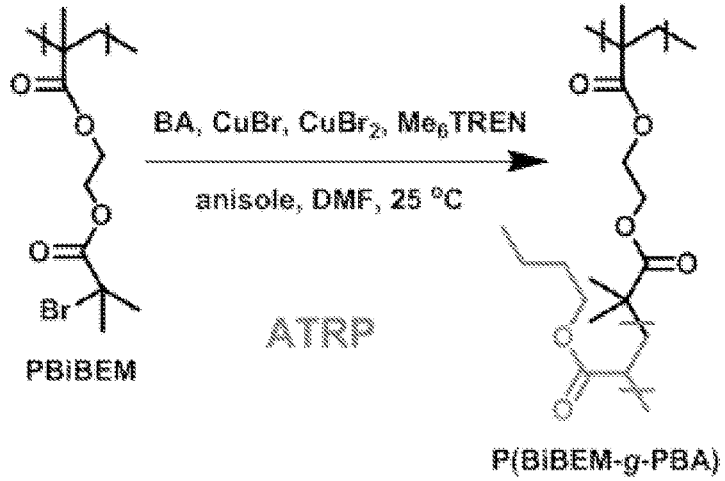
FIG. 1B illustrates an embodiment of synthesis of molecular bottlebrushes with poly(n-butyl acrylate) (PBA) side chains.
Figure 1C:
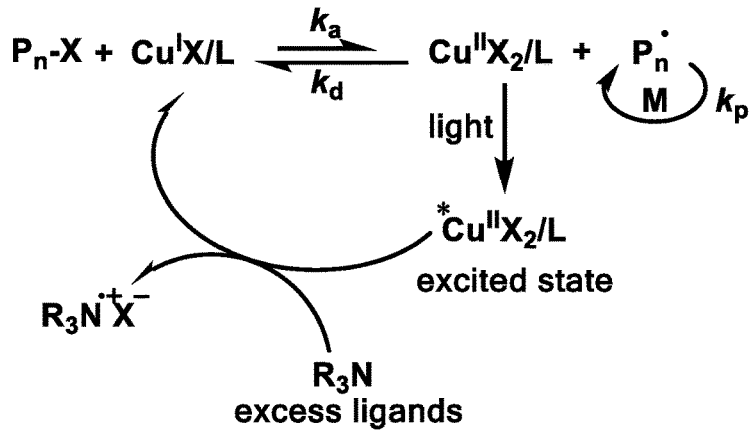
FIG. 1C illustrates a mechanism of photoATRP.

More active ATRP catalysts promote faster CRT and decrease the fraction of chains terminated by combination during a polymerization of acrylates. Therefore, the highly active [Cu(Me$_6$TREN)]$^+$ catalyst was selected to achieve a fast and high-yield synthesis of molecular bottlebrushes with poly(n-butyl acrylate) (PBA) side chains with diminished crosslinking and gelation (see FIG. 1B). A mixed solvent system of DMF and anisole was used to solubilize PBA and the copper complex. The high polarity of DMF increased $K_{ATRP}$ and thus accelerated polymerization. Anisole was added as a co-solvent to solubilize the bottlebrushes, which are only sparingly soluble in pure DMF.

Well-defined PBA bottlebrushes were prepared via a normal ATRP (2400 ppm Cu) at room temperature (25° C.) as described in Table 1 entry H25. Conversion reached 84% in 30 hours. This result is in contrast to previous reports where conversions less than 10% were achieved in about 24 hours with the less active Cu complex based on 4,4'-dinonyl-2,2'-bipyridyne (dNbpy) ligand at elevated temperature.

TABLE 1

| reaction entry | [BA]: [BiBEM]: [CuBr]: [CuBr$_2$]:[L] | ligand | solvent | T (° C.) | time (h) | conv. (%) |
|---|---|---|---|---|---|---|
| H25 | 50:1:0.08:0.04:0.14 | Me$_6$TREN | DMF | 25 | 30 | 84 |
| H80 | 50:1:0.08:0.04:0.14 | Me$_6$TREN | DMF | 80 | 30 | 90 |
| H25x3Cu | 50:1:0.25:0.125:0.375 | Me$_6$TREN | DMF | 25 | 30 | 91 |
| H80x5Cu | 50:1:0.4:0.2:0.63 | Me$_6$TREN | DMF | 80 | 30 | 93 |
| H80TPMA | 50:1:0.25:0.04:0.3 | TPMA | DMF | 80 | 30 | 90 |
| H80ACN$^c$ | 50:1: 0.08:0.04:0.14 | Me$_6$TREN | MeCN | 80 | 24 | 91 |
| H80ACN0.51$^d$ | 50:1:0.08:0.04:0.14 | Me$_6$TREN | MeCN | 80 | 24 | 80 |
| L70 | 50:1:0.5:0.03:1.1 | dNbpy | DMF | 70 | 115 | 70 |

In a number of embodiments hereof, the inter-brush radical/radical termination process is significantly circumvented by introducing or creating a favored catalytic radical termination (CRT) procedure (mechanism c of Figure1A), where one chain is terminated forming a saturated chain end and a "free" radical. Systems, methods and compositions hereof provide a relatively fast and high-yield synthesis of, for example, molecular bottlebrushes (such as polyacrylate bottlebrushes) and other polymers wherein the synthesis of such polymers is conducted under conditions that promote CRT to suppress inter-bottlebrush coupling. The promotion of CRT diminishes or eliminates macroscopic gelation during the synthesis of stars, grafts, or bottlebrushes. Ligands that form catalyst complexes with a $K_{ATRP}$ value greater than 10$^{-5}$ are, for example, suitable for development of conditions that promote CRT. Catalyst complexes with an activity equal to or greater than Me$_6$TREN, ($K_{ATRP}$=1.5×10$^{-4}$) are used in a number of embodiments hereof for developing such conditions. Such active catalyst complexes may, for example, participate in a CRT wherein a HAT agent is present in the reaction medium.

To better characterize the role of CRT in the preparation of representative examples of bottlebrush polymers, the effect of temperature, catalyst concentration, ligand, and solvent on the procedure was investigated. Side chain cleavage experiments and AFM analysis were used to confirm the In the studies of Table 1 poly(BiBEM) with degree of polymerization 372 was used as macroinitiator (BiBEM=2-bromoisobutyryloxyethyl methacrylate unit) (a). The solvent content was 16 vol. % DMF, 64 vol. % anisole, except for H80ACN (wherein the solvent content was 16 vol. % acetonitrile, 64 vol. % anisole) and H80ACN0.51 (wherein the solvent content was 51 vol. % acetonitrile, 29 vol. % anisole). [BA]:[BiBEM]:[CuBr]:[CuBr$_2$]:[Me$_6$TREN]=50: 1:0.08:0.04:0.14 (H25), 50:1:0.08:0.04:0.14 (H80), 50:1: 0.25:0.125:0.375 (H25×3Cu) or 50:1:0.4:0.2:0.63 (H80× 5Cu). The reaction temperature was 80° C. for H80 and H80×5Cu and 25° C. for H25 and H25×3Cu.

Figure 2:
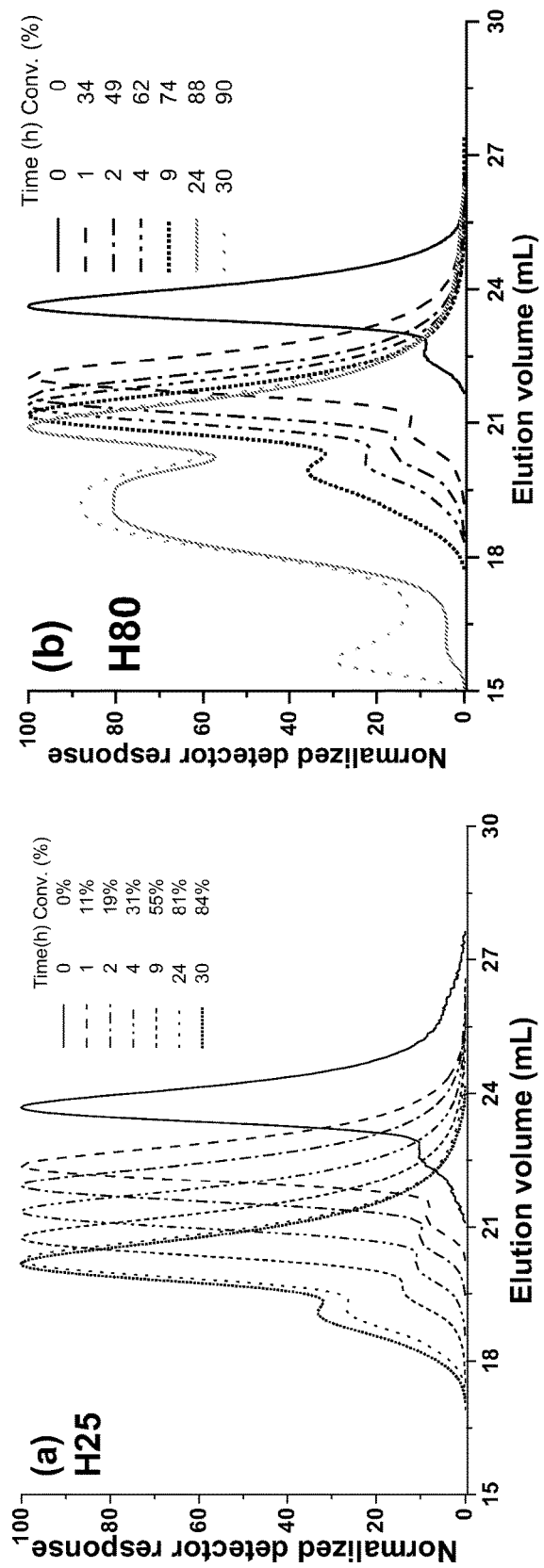
FIG. 2 illustrates evolution of GPC traces during the reaction of (a) H25, (b) H80, (c) H25×3Cu, and (d) H80× 5Cu.
Figure 2:
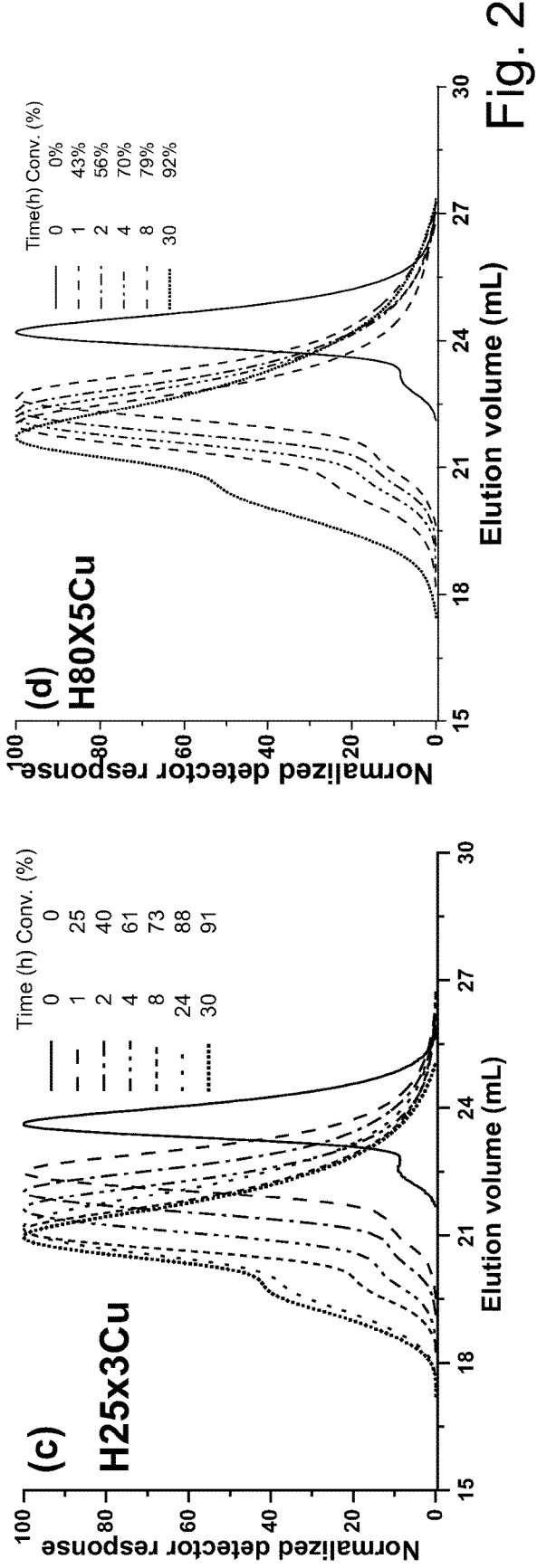
Figure 3:
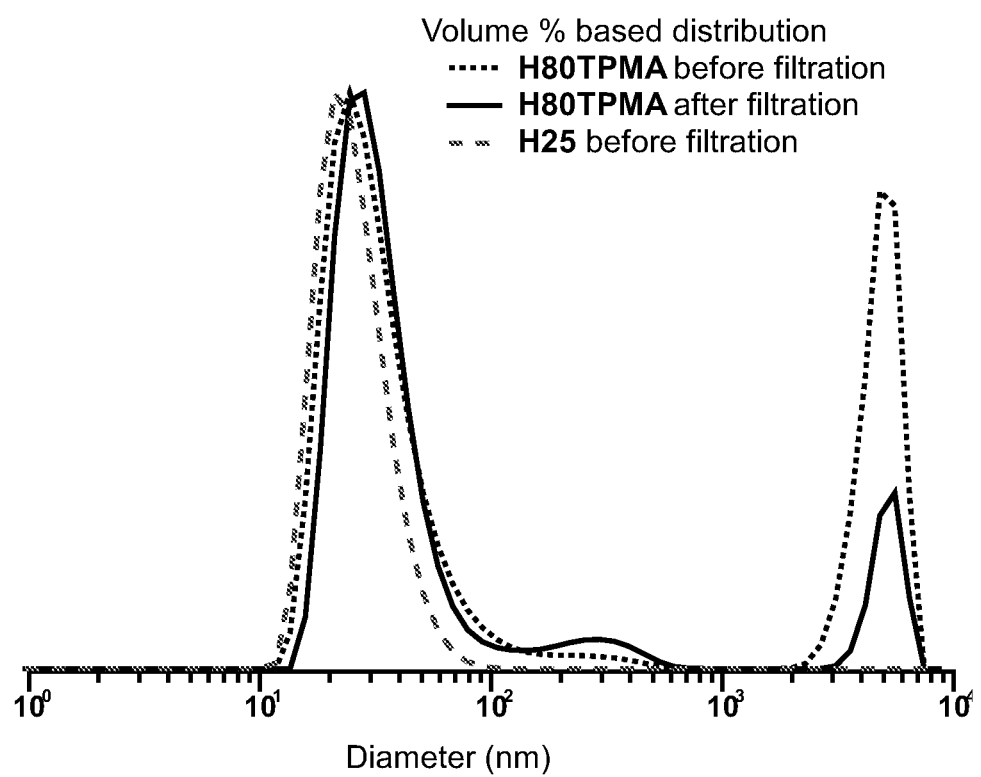
FIG. 3 illustrates volume distribution of H80TPMA sample and H25 measured by dynamic light scattering.

Coupling between macroinitiators during side chain growth was detected by monitoring the appearance and increase of a high-molecular-weight shoulder in gel permeation chromatography of different polymers prepared at different time intervals during the continuous grafting from reaction. (GPC, FIG. 2, panel a). The small shoulder in the GPC traces at the early stage of the polymerization originates from the backbone and should not be attributed to inter-bottlebrush coupling, see the trace at t=0 in FIG. 2. Deconvolution of the GPC traces was performed to quantitatively measure the weight fraction of coupled species. At room temperature, only 18% of the bottlebrushes coupled as a result of termination via inter-brush combination (coupling). No macroscopic or microscopic gelation was detected by dynamic light scattering (DLS) (FIG. 2). The effect of reaction temperature and concentration of Cu catalysts is shown in FIG. 2 and will be discussed in the subsequent paragraphs, followed by the effect of ligand and solvent in the different runs listed in Table 1.

Figure 4:
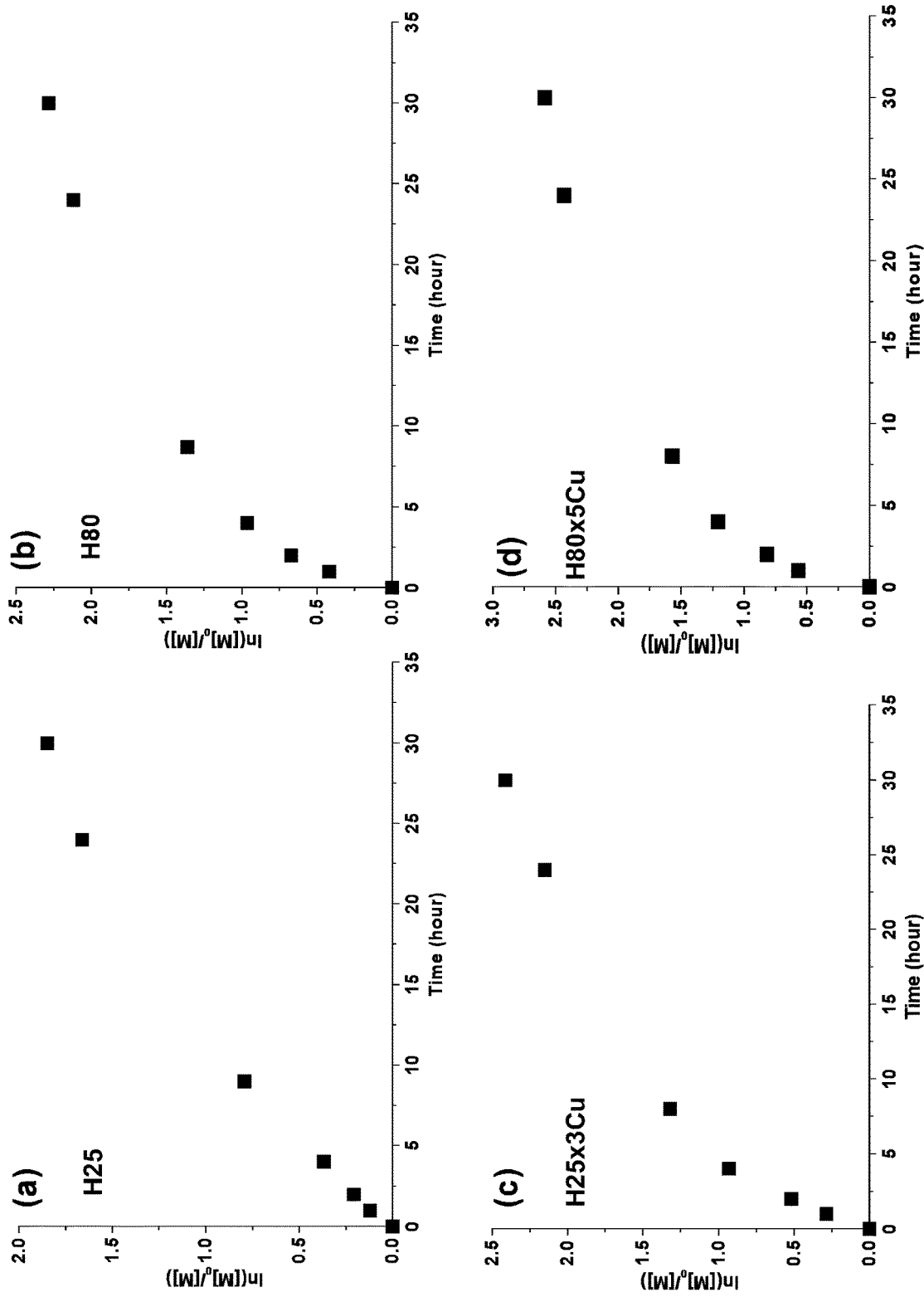
FIG. 4 illustrates kinetic plots of the reactions of (a) H25, (b) H80, (c) H25×3Cu, and (d) H80×5Cu.

Effect of Temperature. The temperature was increased from 25 to 80° C. in the experiment H80 (Table 1 and FIG. 2, panels b and d). Monomer conversion increased from 84% to 90% in 30 hours due to higher values of $K_{ATRP}$ and propagation rate coefficient ($k_p$) (FIG. 4). The fraction of coupled bottlebrushes increased significantly with temperature. The reaction at 80° C. resulted in 61% coupled bottlebrushes and formed a macroscopic gel, compared to 18% coupling and no gel formed at 25° C., H25 vs. H80 in FIG. 1. The actual weight fraction of coupled bottlebrushes in H80 could be even higher than 61% because of the removal of larger clusters of bottlebrushes by the filtration step (0.45 µm filter) during the preparation of GPC samples. Without limitation to any mechanism, increased coupling may, for example, be explained by the decrease of $K_{OMRP}$. (mechanism c of FIG. 1A). $\Delta G_{OMRP} < 0$ and thus, by increasing the temperature from 25° C. to 80° C., the concentration of L/Cu$^{II}$-P$_n$ intermediate decreased thereby diminishing the contribution of CRT to reducing inter-brush crosslinking. The liberated free radicals underwent bimolecular radical termination via combination, resulting in increased inter-bottlebrush coupling. Thus, lower T is beneficial to promote CRT, and consequently to reduce bottlebrush coupling via conventional radical termination.

Effect of Catalyst Concentration. At higher concentrations of copper(I) catalyst, more L/Cu$^{II}$-P$_n$ is formed and CRT is favored. When the total copper concentration was increased by a factor of 3, and the polymerization was carried out at 25° C., run H25×3Cu in Table 1, the weight fraction of coupled bottlebrushes decreased from 18% to 12%. At 80° C., the effect was even more pronounced: when the total amount of copper was increased by a factor of 5, run H80×5Cu in Table 1, the fraction of inter-bottlebrush coupling decreased from 61% to 10%, with the amount of high molecular weight product relatively constant throughout the polymerization (FIG. 2, panel d). In the reactions carried out with an increased initial copper concentration, the [Cu$^I$]/[Cu$^{II}$] ratio was held constant to ensure a similar position of the ATRP equilibrium, and thus generating a similar radical concentration and similar rate of radical termination (RT).

Figure 5:
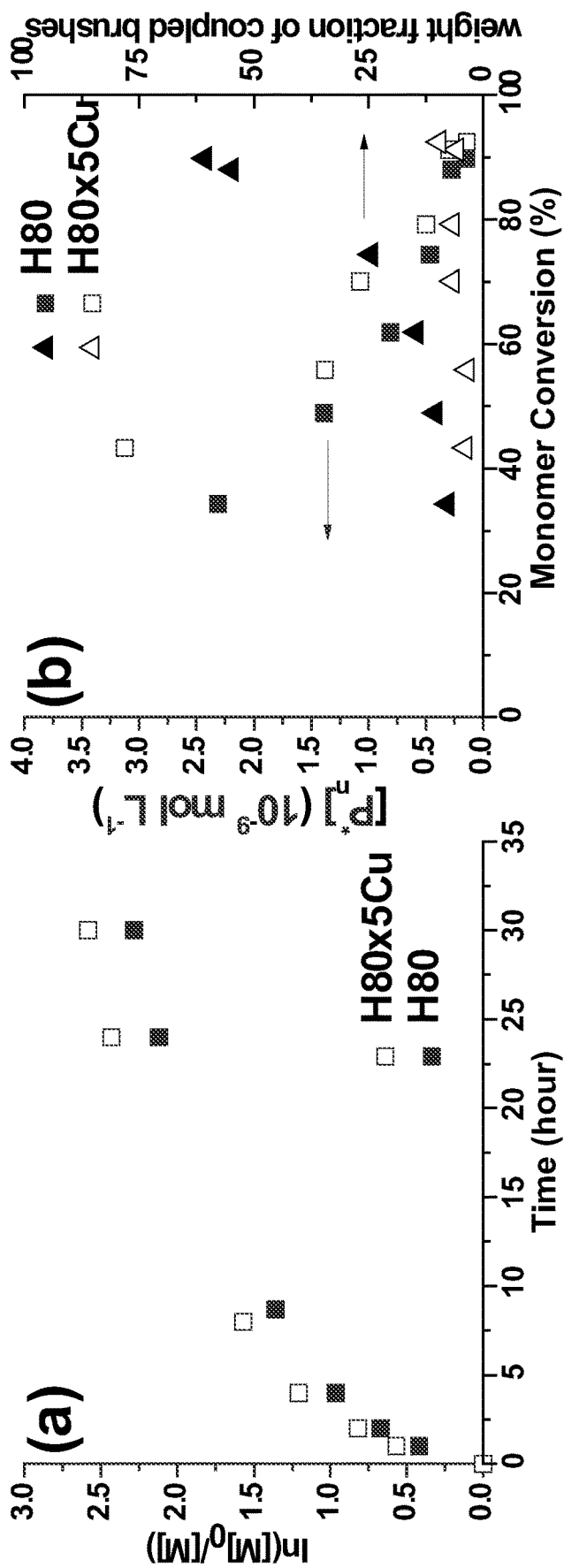
FIG. 5 illustrates a comparison between experiments H80 (filled symbols) and H80×5Cu (hollow symbols) wherein the panels set forth (a) Kinetics of monomer consumption. (b) Concentration of propagating radicals and weight fraction of coupled chains vs. monomer conversion.

The polymerization kinetics of the two reactions at 80° C. is illustrated in FIG. 5, panel a. The semilogarithmic plots showed curvature indicating a decreasing concentration of propagating radicals vs. time. This result was due to radical termination—either RT or CRT—with concurrent conversion of Cu(I) to Cu(II). Radical concentration was calculated as $[P_n\cdot] = k_p^{app}/k_p$, using a literature value of $k_p = 5.0 \times 10^4$ M$^{-1}$ s$^{-1}$. Radical concentration decreased with time because termination depleted [Cu(I)] from solution (see FIG. 5, panel b) according to the persistent radical effect (PRE). The persistent radical effect is described, for example, in Chem. Rev. 2001, 101, 3581.

Figure 6:
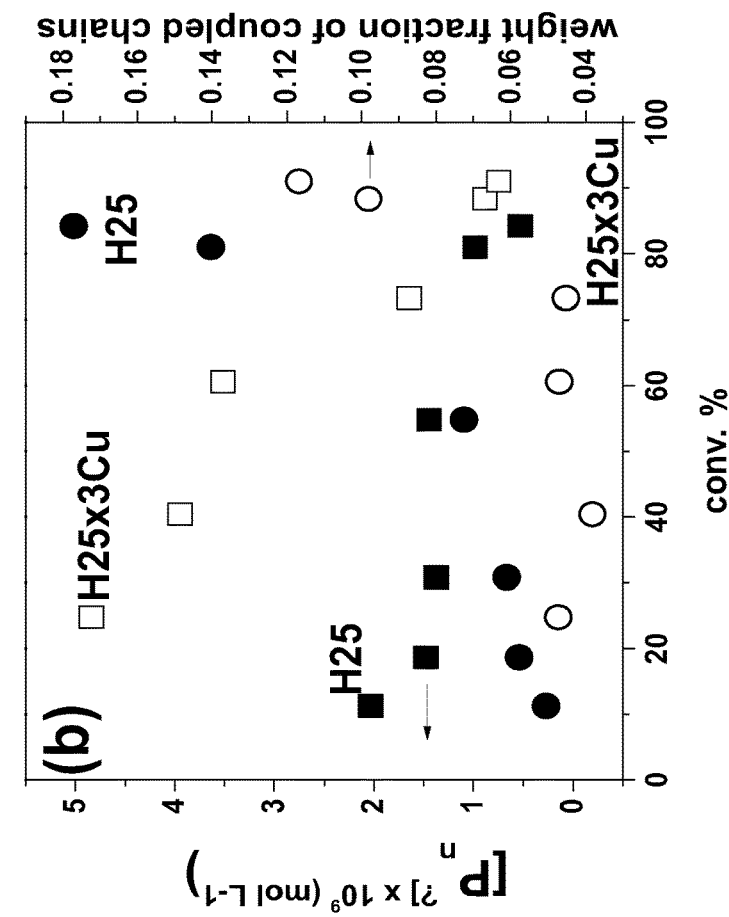
FIG. 6 Illustrates a comparison between experiments H25 (filled symbols) and H25×3Cu (hollow symbols) wherein the panels set forth (a) Kinetics of monomer consumption. (b) Concentration of propagating radicals and weight fraction of coupled chains vs. monomer conversion.
Figure 6:
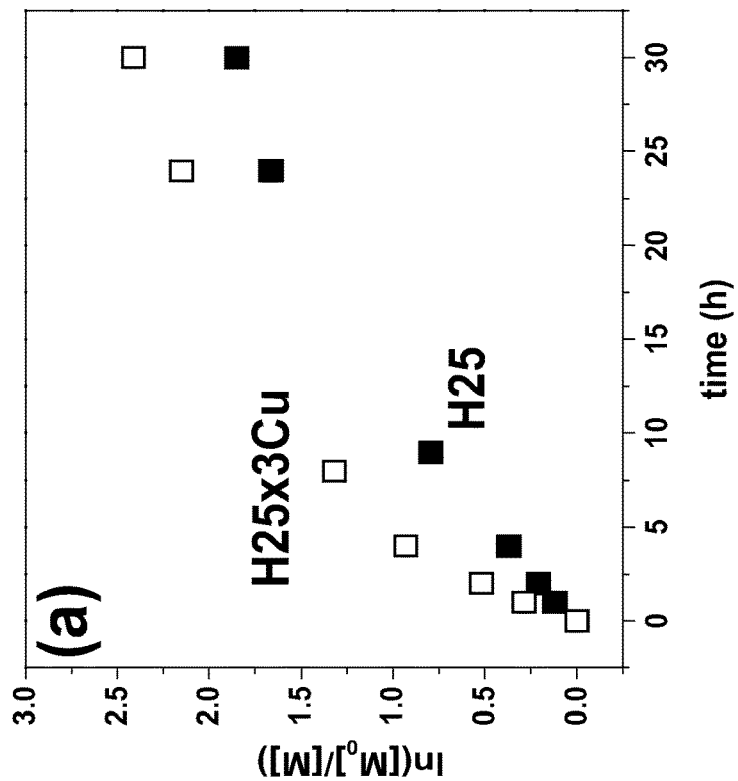

Despite the 5-fold difference in [Cu(I)]$_0$, runs H80 and H80×5Cu had similar kinetics and a similar decrease of radical concentration. It is worth noting that the initial concentration of Cu(I) activator in H80 and H80×5Cu was 8% and 40% mol. vs. alkyl halide chain ends, respectively. The slightly higher rate in H80×5Cu could be a result the fact that the [Cu$^I$]/[Cu$^{II}$] ratio during polymerization was less affected by the PRE (that is, increase in [Cu$^{II}$] as a result of termination) as a result of the much higher initial [Cu$^I$]$_0$. However, the similar kinetic plots indicate that more termination occurred in H80×5Cu, since, as a result of the much higher initial [Cu$^I$]$_0$, more copper was consumed in this reaction. Thus, the higher [Cu$^I$]$_0$ promotes CRT A similar effect was observed when the polymerization was conducted at 25° C. (see FIG. 6).

The weight fraction of coupled chains increased faster at the end of the polymerization, when polymerization rate was slowest and concentration of radicals lowest (see FIG. 5, panel b). At this stage the concentration of Cu$^I$ was lowest, which decreased the probability of CRT vs conventional RT. In addition, the overall polymer concentration increased with conversion and this enhanced the probability of inter-brush vs. intra-brush side chain termination.

At higher [Cu$^I$] concentrations, the OMRP equilibrium is shifted towards R—Cu(II) species and this kinetically promotes CRT. Therefore, H80×5Cu had a lower fraction of coupled chains but a higher concentration of terminated chains than H80 as a result of the enhanced CRT processes. A similar result was achieved at lower temperature for H25 and H25×3Cu. The observed decrease of inter-bottlebrush coupling with increased catalysts concentration confirmed the beneficial effect of CRT in the synthesis of bottlebrushes.

Figure 7:
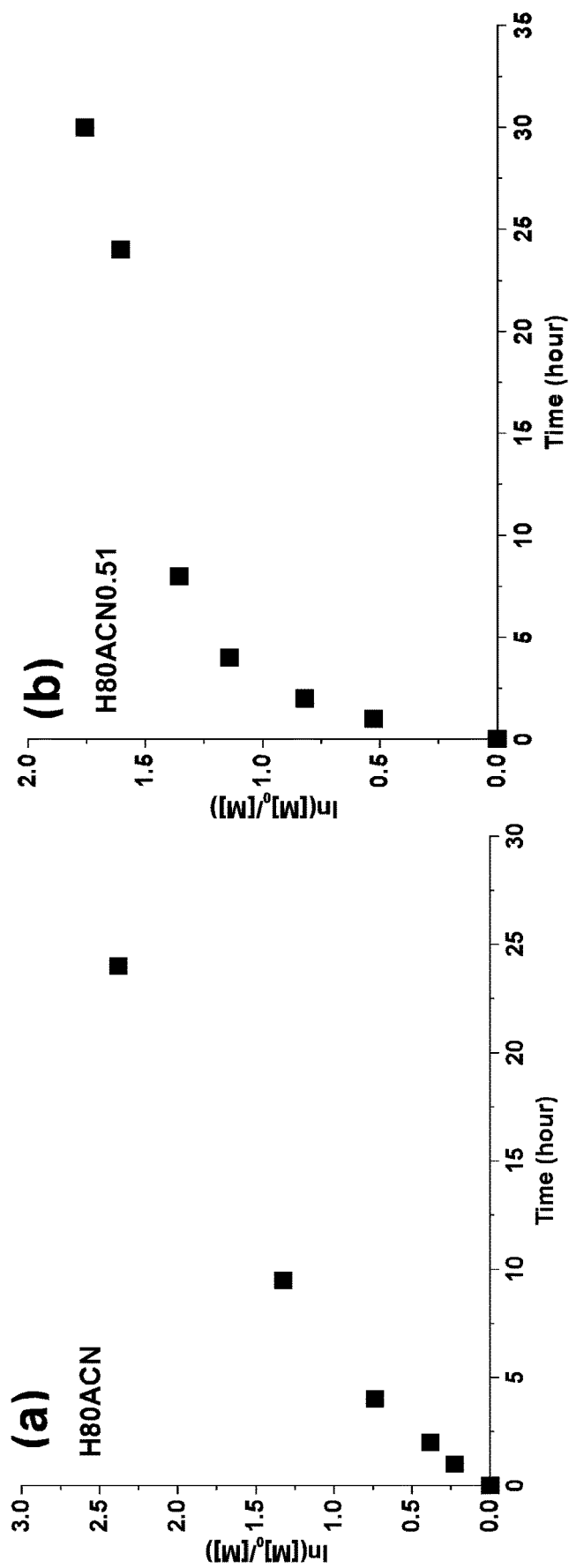
FIG. 7 illustrates kinetic plots of the reactions of (a) H80ACN and (b) H80ACN0.51.
Figure 8:
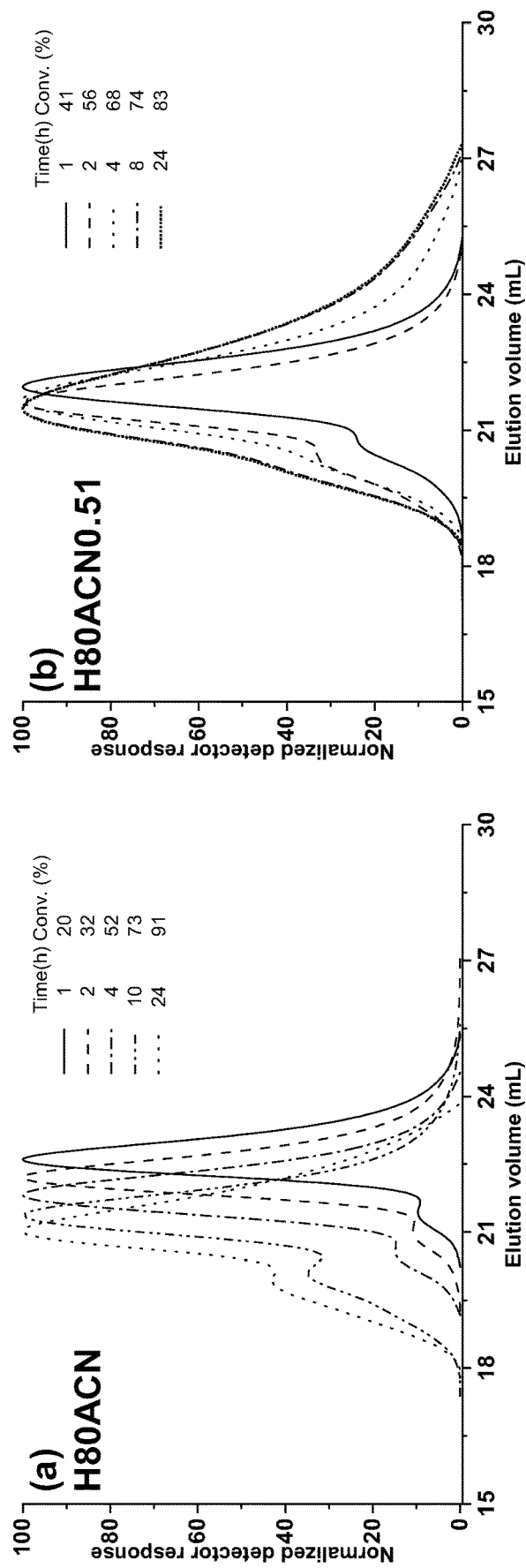
FIG. 8 illustrates evolution of GPC traces during the reaction of (a) H80ACN and (b) H80ACN0.51.

Effect of solvent. The polymerization kinetics were similar in DMF/anisole 1:4 and in MeCN/anisole 1:4 (see FIG. 7), with 90% conversion achieved after 24 hours in both cases. However, when the amount of MeCN was increased from 16 vol. % to 51 vol. % (MeCN/anisole≈2:1), the final conversion decreased to 80% after 24 hours. This observation may, for example, be attributed to a lower value for $K_{ATRP}$ in MeCN compared to DMF, which led to a decreased rate of polymerization. Generally, the final conversion did not change significantly when altering the initial amount of copper, ligand, temperature, or solvent, with all reactions achieving ≥80% conversion in 24 hours. However, the degree of bottlebrush coupling and macroscopic gelation were strongly dependent on the solvent. When the polar component in the solvent mixture was reduced by changing from DMF to MeCN, the degree of inter-bottlebrush coupling decreased dramatically under otherwise similar conditions. For example, at 80° C. 61% coupling and gelation were observed in DMF, while only 19% coupling and no gelation were observed in MeCN. Upon increasing the volume fraction of MeCN from 16% to 51%, the GPC traces were significantly broader, so that it was difficult to quantify coupling by deconvolution of GPC traces (see FIG. 8, panel b). Nevertheless, the amount of coupled chains appeared to be similar in the two experiments, based on the height of the high-MW shoulder. Another feature of the GPC trace with 51% MeCN was a prominent low-molecular-weight tailing, which suggest a process of radical transfer and generation of a new non-brush chains. These low molecular weight products could potentially be a linear impurity in the final products.

As discussed above, the mechanism of CRT in MeCN involves hydrogen atom transfer from CH$_3$—CN to the L/Cu$^{II}$-P$_n$ organometallic intermediate resulting in formation of the ·CH$_2$—CN radical which can initiate new chains. DMF, on the other hand, does not possess C—H bonds capable of undergoing this catalyzed transfer process. Overall, a solvent favoring halogen abstraction resulted in less inter-brush coupling but slightly less polymerization control during the production of bottlebrush copolymers in high yield.

Figure 9:
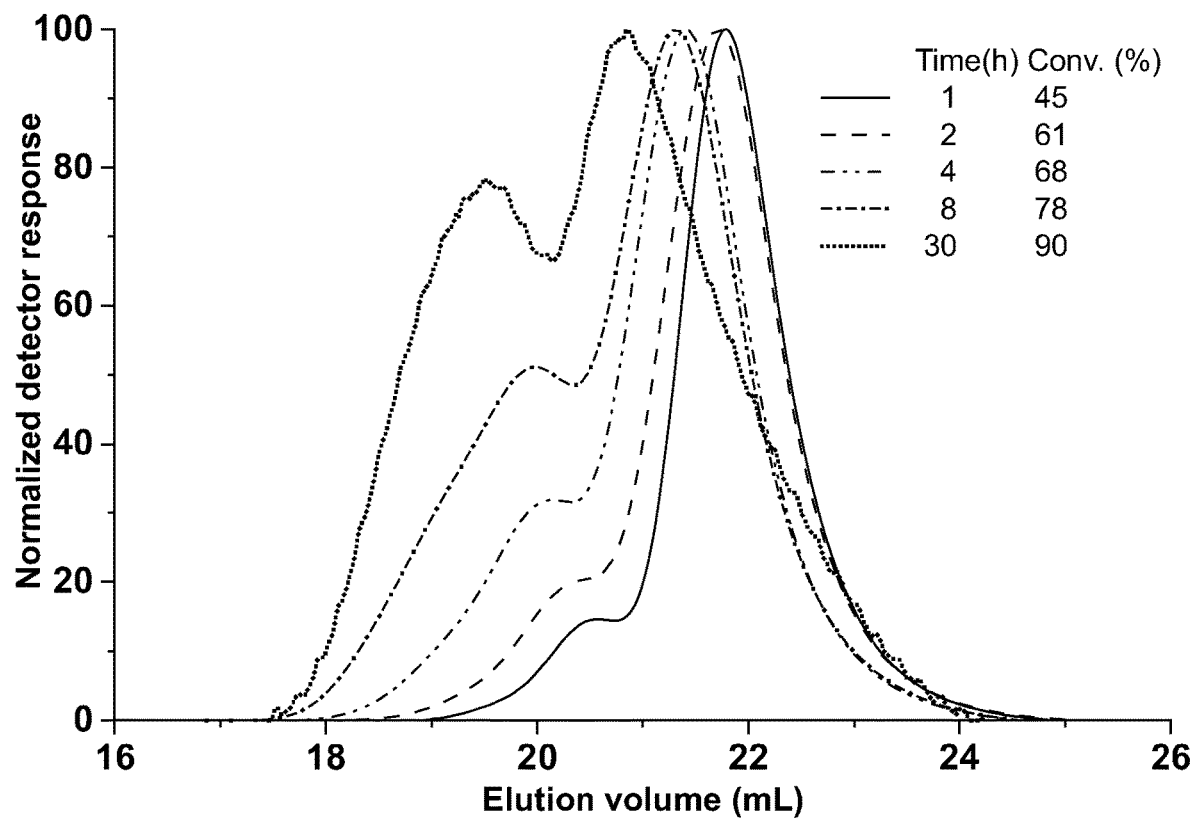
FIG. 9 illustrates evolution of GPC traces during the synthesis of molecular bottlebrushes under the initial conditions: [BA]:[BiBEM]:[CuBr]:[CuBr$_2$]:[TPMA]=50:1: 0.25:0.04:0.3 in DMF (16%) and anisole (64%) at 25° C.

Effect of Copper Ligand. The less active Cu$^I$/tris(2-pyridylmethyl)amine (TPMA) was tested, run H80TPMA, Table 1. A 3-fold higher [Cu(I)]/[Cu(II)] ratio was used to maintain a similar polymerization rate with respect to the reference reaction with $Cu^I/Me_6TREN$ (H80). Reaction rate and final conversion were similar in the $Me_6TREN$-based and TPMA-based systems, with 90% monomer conversion in 30 hours. However, the higher $[Cu^I]_0$ did not result in reduced inter-brush coupling: H80TPMA and H80 essentially had a similar evolution profile of coupling (see FIG. 9), despite the 3-fold higher [Cu(I)/TPMA]. This observation may, for example, be a result of the lower activity of Cu(I)/TPMA compared to Cu(I)/$Me_6TREN$ and presumably lower CRT activity, which reduces the beneficial effect of $[Cu^I]_0$. Hence, in a number of embodiments hereof, the use of more active ligands is desirable for high-yield synthesis of non-crosslinked bottlebrush molecules assisted by CRT.

Summary of effects of reaction conditions on inter-bottlebrush coupling. The evolution profiles of fraction of coupled bottlebrushes and weight fraction of coupled bottlebrushes vs. monomer conversion, under various initial conditions are summarized in FIG. 9. By promoting CRT under the following conditions: (1) lower temperature, (2) higher Cu(I)/L concentration, (3) solvent favoring hydrogen abstraction, and (4) high activity of the ATRP catalytic system, coupling and macroscopic gelation in the high-yield synthesis of molecular bottlebrushes was significantly reduced. Individually and collectively, the-above-identified conditions are desired conditions in enhancing CRT and limiting intermolecular crosslinking in ATRP reactions.

Figure 10:
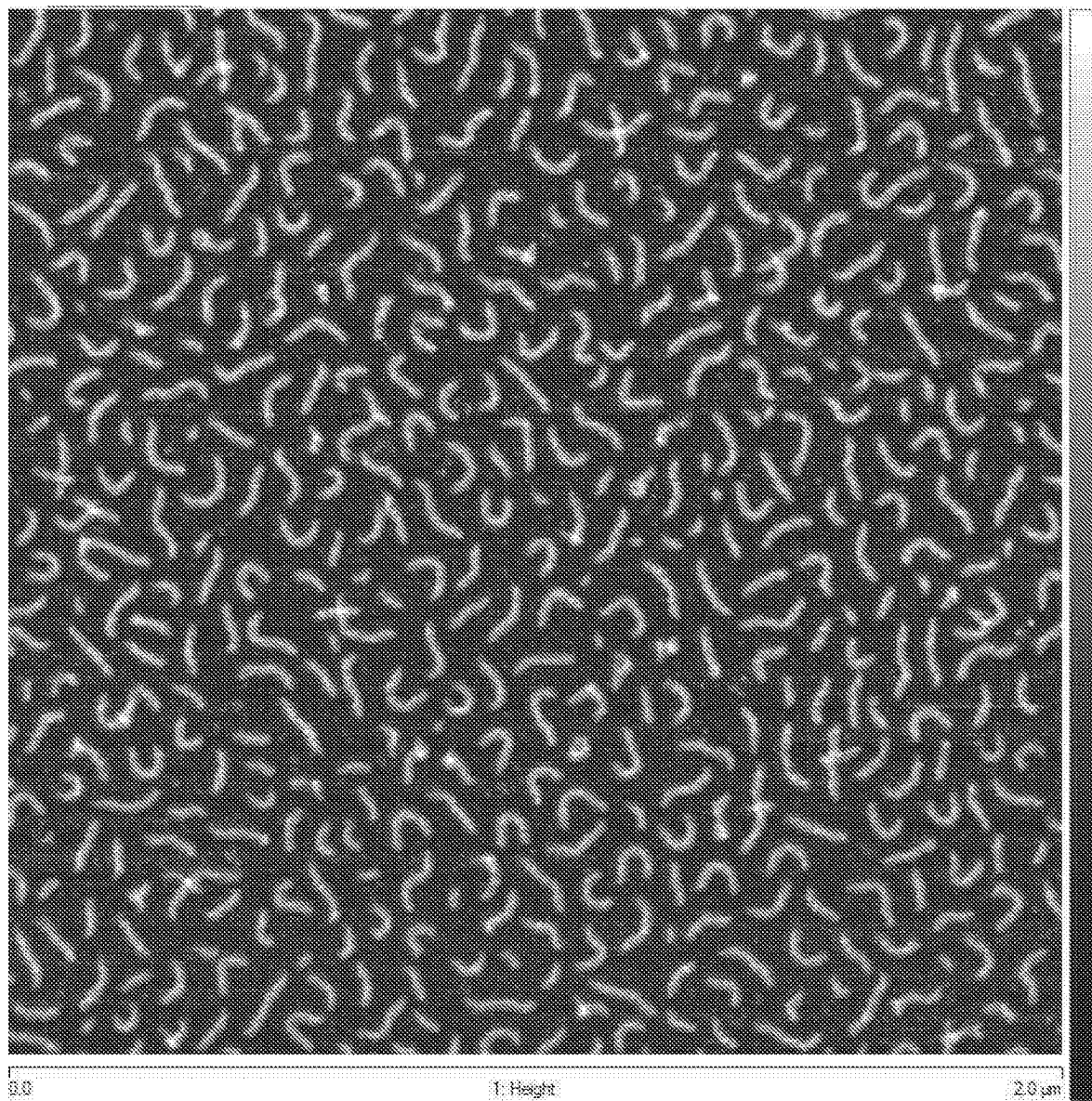
FIG. 10 illustrates AFM height images of molecular bottlebrushes isolated from H25 deposited on mica surfaces.

Physical characterization of products: As shown in FIG. 10, atomic force microscopy (AFM) was used to visualize the isolated molecular bottlebrushes synthesized in the reaction H25, Table 1. It can be observed that the molecular bottlebrushes adapted worm-like conformations, indicating stretching of polymer backbone as a result of high grafting density. The good control over both bottlebrush molecule width and length were confirmed by the narrow distribution of both parameters in the statistical analysis of the AFM images. The number-average contour length ($L_n$) and width ($W_n$) were $L_n$=97.1±0.8 nm and $W_n$=39.2±0.6 nm, respectively. The degree of polymerization (DP) of the polymeric backbone in this study was 372. Assuming the backbone adapted a fully extended conformation, with the length of the C—C—C monomeric unit equal to 0.25 nm, the contour length of molecular bottlebrush should be 93 nm, which correlates well to the AFM analysis. Quantification of the weight fraction of coupled brushes using AFM images of the product of H80TPMA were attempted by measuring the fraction of coupled brushes that cannot be separated using linear PBA as the diluent when preparing the Langmuir-Blodgett film for AFM analysis. However, the estimated weight fraction of coupled brushes (<20%) was lower than the value determined by GPC (~30%), which could arise from the use of linear polymers as standards in the GPC, thereby amplifying the fraction of high MW materials.

High grafting density is an important parameter for molecular bottlebrushes, since their unique properties, such as high persistence chain length, are governed by steric interactions between the side chains. Thus, efficient initiation is desirable for "grafting-from" methods. To quantify initiation efficiency, the side chains of the molecular bottlebrushes were cleaved via solvolysis and the molecular weights were analyzed via GPC. 85% Initiation efficiency was calculated for the synthesized bottlebrushes shown in FIG. 10, sample H25 in Table 1. To compare the result to previous reports, a control experiment was conducted using the less active dNbpy-based catalyst for which 70% conversion was achieved in 115 hours at 70° C. with 88% initiation efficiency, L70C, Table 1. The similar initiation efficiencies using two different catalytic systems indicated that the conditions presented in the study of embodiments hereof provided comparable control over the growth and density of the side chains, but in a more efficient and faster reaction that additionally required a lower $[L/Cu^I]_0$.

In a number of studies hereof, molecular bottlebrushes were successfully synthesized with high yield via ATRP with high monomer conversion (>80%) in ca. 24 hours without macroscopic gelation. Crosslinking was avoided by selecting conditions that promoted CRT, instead of conventional bimolecular radical termination (RT). CRT was favored by conducting the grafting from polymerization under the following conditions: (1) lower temperature, (2) higher Cu(I)/L concentration, (3) presence of a solvent favoring hydrogen abstraction, and (4) a more active ATRP catalytic system. A solvent favoring hydrogen abstraction, though allowing better control against macroscopic gelation, could generate new chains as impurity. Side chain cleavage experiments confirmed high grafting density (>85%) of bottlebrushes, indicating effective control over polymerization. Molecular visualization using AFM confirmed the well-defined structure of prepared PBA molecular bottlebrushes. In that regard, under enhanced or favored CRT conditions (that is, conditions under which CRT is favored over RT or greater than 50% of terminations occur by CRT), interchain crosslinking is desirably limited.

Influence of Additives on CRT: Triphenylmethane (TPM) has been shown to be very effective at suppressing coupling of chains. Increasing equivalents of TPM for grafting from ATRP shows a decrease in the rate of propagation but increased suppression of inter-brush coupling and tailing. The solvent transfer coefficient, ($C_s$) of TPM for methacrylic acid at 60 degrees with 80% MA, 20% DMF by volume was found to be 0.0189. Standard free radical polymerizations (FRP's) show a large decrease in $k_p$ as the concentration of TPM increased. Other chain coupling suppression agents such as Hantzsch esters also reduce inter-brush coupling. Stable radicals such as TPM may be used as a radical trap. In such stable radicals, the formed radical does not have to immediately react with something but can exist for a much longer time frame than a reactive radical. In the example of TPM, the formed radical lives sufficiently long to eventually interact with another TPM based radical and dimerize. The addition of a stable radical/radical trap suppresses coupling of chains. In general, compounds forming such stable radicals/radical traps have a labile hydrogen. Hydrogen atom transfer from the compound forms a relatively stable radical which is not capable or has very limited capability of extracting a halogen from an alkyl halide. Only the transition metal catalyst complex can thus continue the polymerization. The stable radicals eventually dimerize as described above. Hydrogen atom transfer from a compound such as TMP may be more favorable than abstraction from compounds such as MeCN. Low molecular weight impurities associated with, for example, MeCN, may be avoided.

The requirement of conducting the formation of bottlebrush copolymers under mild conditions with a more active ATRP catalytic systems prompted an examination of photoATRP as a process for preparing the bottlebrushes via a grafting from procedure as photoATRP allows for precise temporal and spatial control under mild experimental conditions. PhotoATRP is discussed, for example in Prog. Poly. Sci. 2016, 62, 73 and Chem. Rev. 2016, 116, 1969, the disclosures of which are incorporated herein by reference. PhotoATRP uses light and electron donors, for example, alkyl amines, and optionally excess ligands, to continuously regenerate the activator form of an ATRP copper catalyst (see FIG. 1C). Indeed, a small excess of amine ligand (L) is generally sufficient to provide sufficient activator regeneration.

In model studies with a traditional small molecule initiator ethyl α-bromoisobutyrate, the use of a very active catalyst complex such as the Cu/tris([[(4-methoxy-2,5-dimethyl)-2-pyridyl] methyl)amine (Cu/TPMA*3) catalyst complex was found to be beneficial for fast and well controlled synthesis of polymer chains under low catalyst loading, that is 150 ppm to monomer. In contrast, the less active Cu/tris(2-pyridylmethyl)amine (Cu/TPMA) catalyst required a higher catalyst loading, 600 ppm, providing a slower polymerization rate, to obtain controlled polymer growth. The relative values for $K_{ATRP}$ for catalyst complexes prepared with TPMA and TPMA*3 are $10^{-5}$ and $10^{-2}$ respectively (that is, Cu/TPMA*3 is 1000 times more active and is currently the most active ATRP catalyst that has been prepared). Therefore, Cu/TPMA*3 was employed for the photoATRP synthesis of molecular bottlebrushes of different functional monomers, with pH- or thermo-responsive properties.

Figure 11:
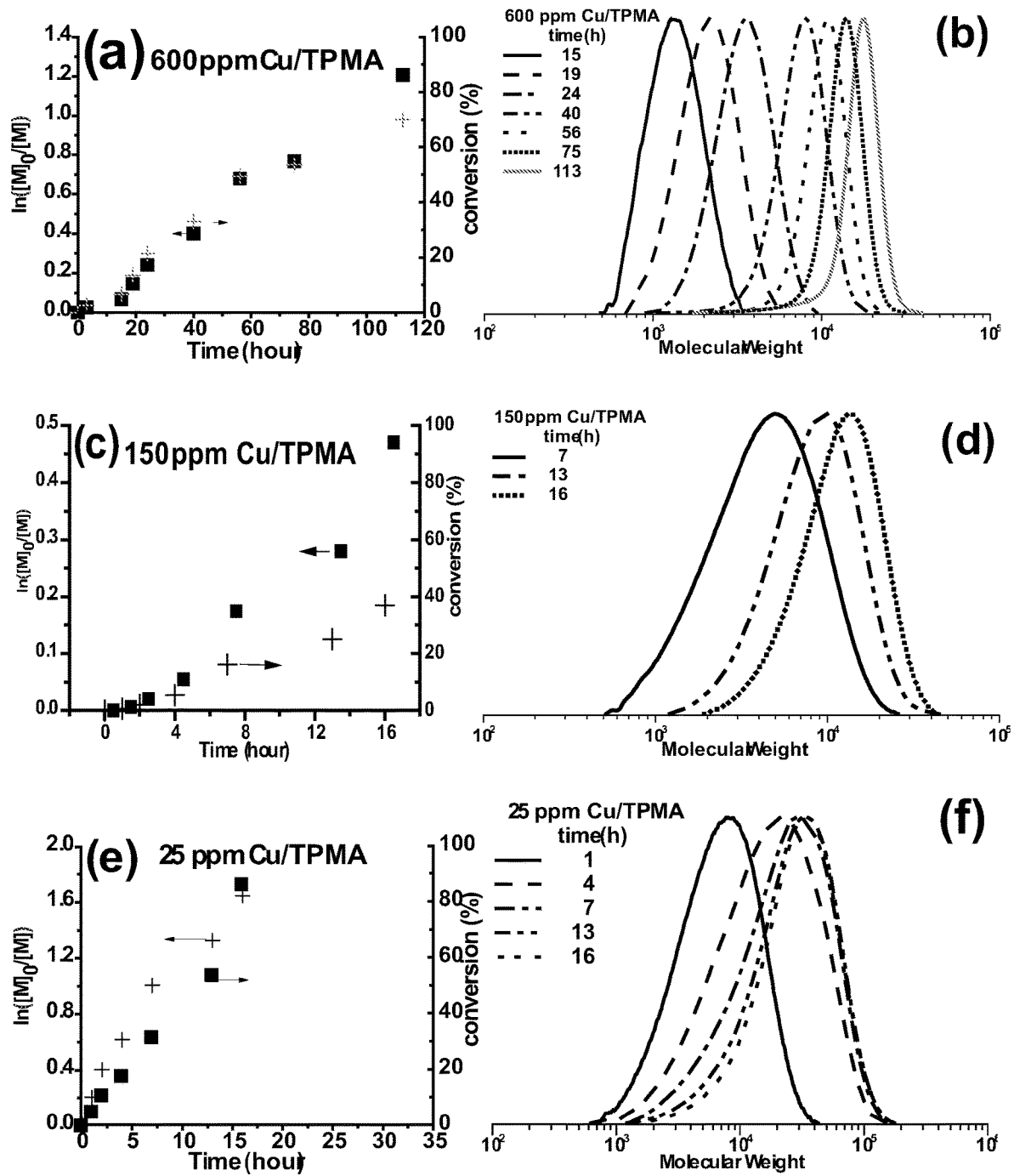
FIG. 11 illustrates kinetic plots (panels a, c, e) and GPC trace evolution (panels b, d, f, calibration based on linear polystyrene) during the polymerization of BA with 600 ppm, 150 ppm and 25 ppm of Cu/TPMA catalyst; irradiation by 360 nm at 4.9 mW/cm$^2$ at room temperature 25° C., 16 vol. % DMF, 64% anisole; [BA]:[EBiB]: [CuBr$_2$]: [TPMA]=200:1:x:6x, x=0.12, 0.03 or 0.005; wherein irradiation was stopped from 7th to 24th hour in the polymerization with 150 ppm and 25 ppm Cu/L catalyst.
Figure 12:
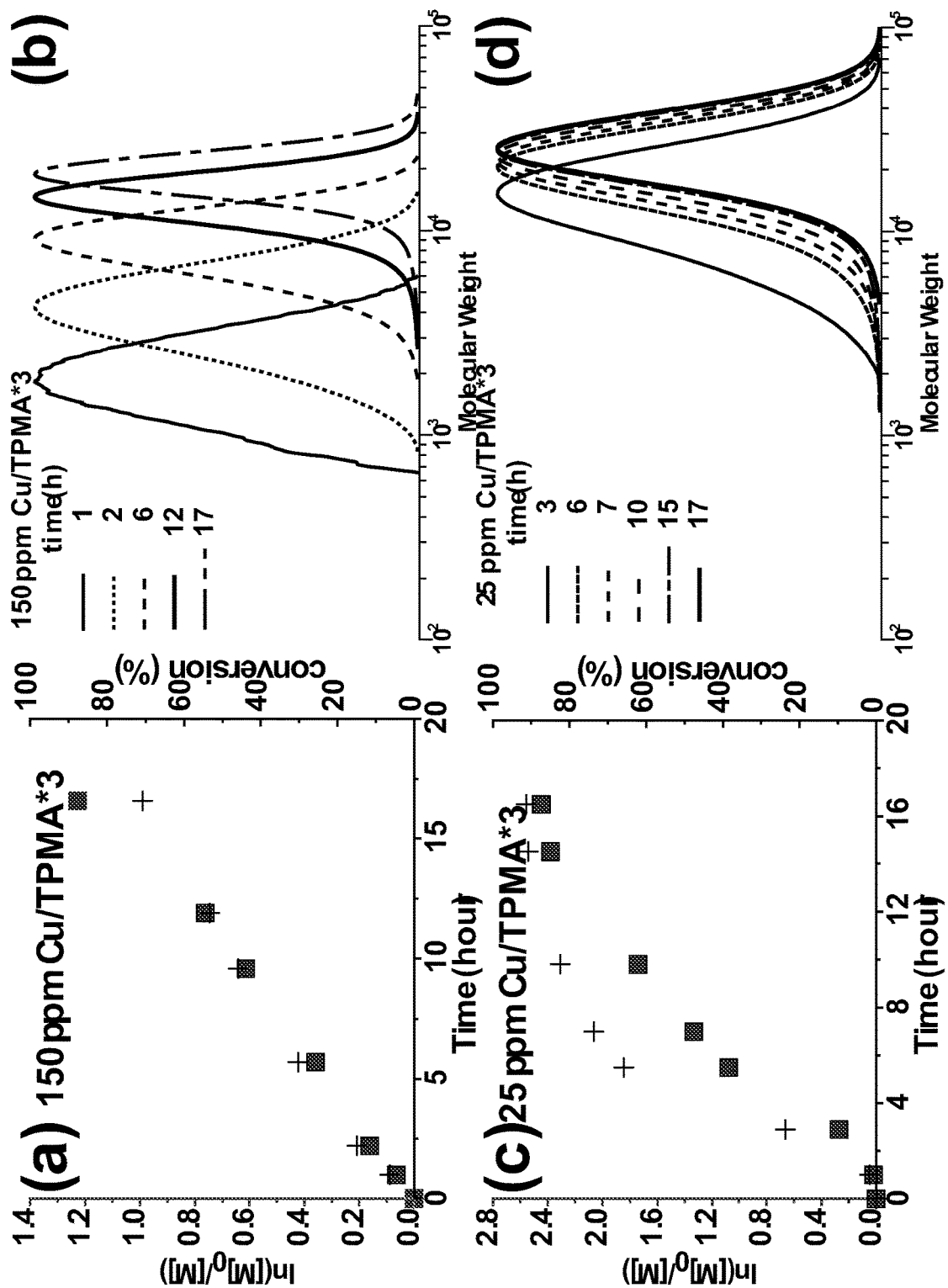
FIG. 12 illustrates a polymerization of BA with 150 ppm or 25 ppm Cu/TPMA*3 catalyst. (panels a and c) Kinetic plot; (panels b and d) GPC trace evolution (calibration based on linear polystyrene). Condition: [BA]:[EBiB]: [CuBr$_2$]: [TPMA*3]=200:1:x:2x, x=0.03 or 0.005, irradiation by 360 nm at 4.9 mW/cm$^2$ at room temperature 25° C., 16 vol. % DMF, 64% anisole.

Prior to the preparation of molecular bottlebrushes via PhotoATRP, different catalysts and varied catalyst concentration were tested with a small molecule initiator, ethyl α-bromoisobutyrate (EBiB). Butyl acrylate (BA) was polymerized with two copper catalysts of different activity: Cu/TPMA and Cu/TPMA*3. The results of model polymerizations with different amounts of Cu/TPMA and Cu/TPMA*3 are shown in FIG. 11 and FIG. 12 respectively. With the less active TPMA ligand, rate of polymerization strongly increased with decreasing copper concentration: polymerization was 6.4 times faster when [Cu] was decreased from 600 to 25 ppm (see Table 2, entries 1-3 in the Experimental Examples below). This observation is likely a result of lower optical density and thus faster photoreduction of the smaller amount of copper, hence an increased ratio of $Cu^I/Cu^{II}$. On the other hand, polymerization control was decreased by decreasing catalyst concentration, with Ð exceeding 1.3 when 150 and 25 ppm of catalyst where employed.

In summary, polymerization with TPMA ligand was relatively highly controlled with a relatively large amount of copper, 600 ppm, at the cost of a very slow polymerization rate. The more active Cu/TPMA*3 catalyst allowed for both faster polymerization and better control. Good polymerization control was obtained with both 150 and 25 ppm of copper, as shown in Table 4, entries 4-5 in the Experimental Examples below. Polymerization was 2-3 times faster with Cu/TPMA*3 than with Cu/TPMA under otherwise identical conditions.

Figure 13:
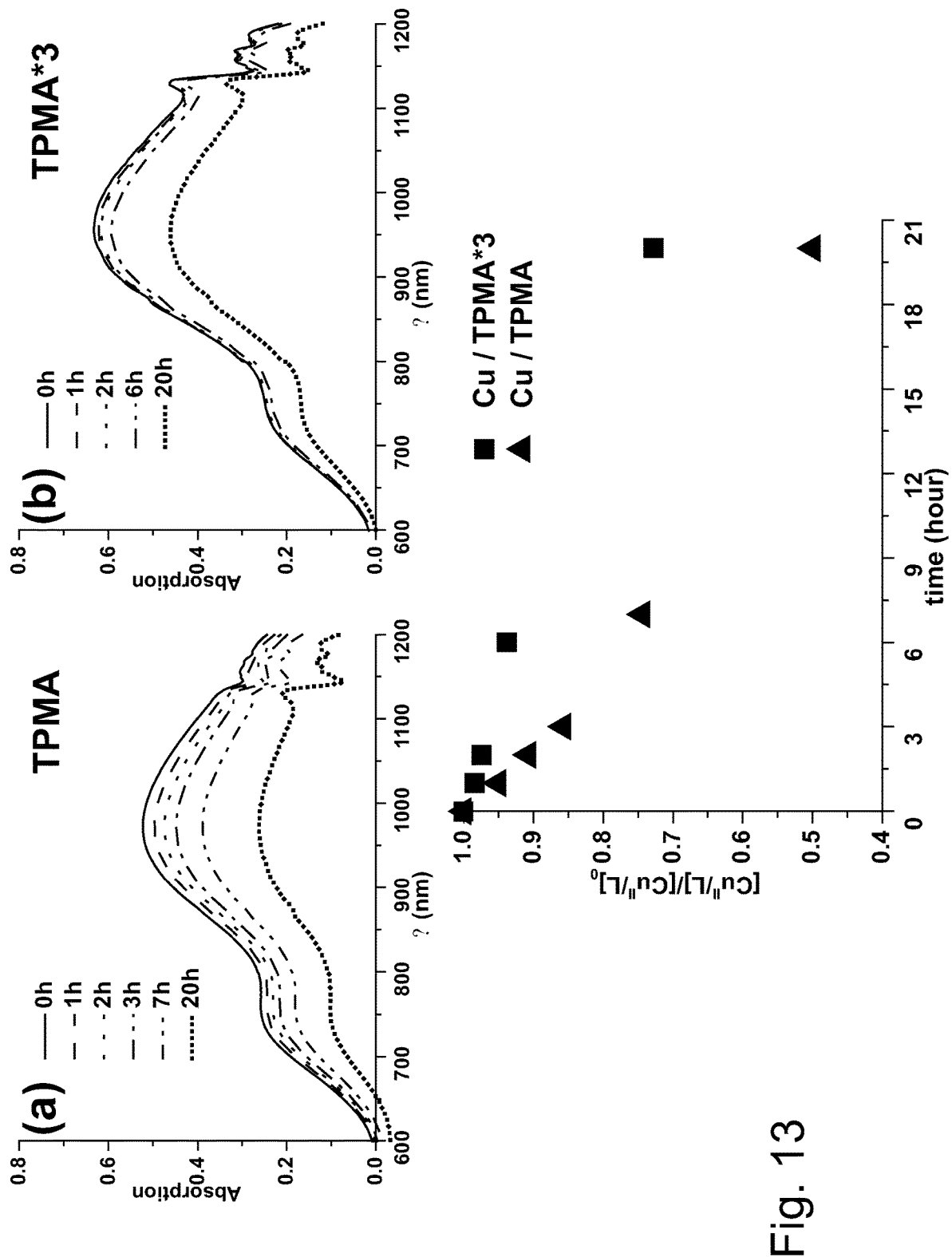
FIG. 13 illustrates UV-vis/NIR spectra recorded during irradiation of (a) Cu(II)/TPMA and (b) Cu(II)/TPMA*3.

To understand the different polymerization rate when using different copper catalytic systems, evolution of Cu(II)/L concentration was monitored via UV/Vis for both copper complex when exposed to irradiation in the absence of alkyl bromide (see FIG. 13). The Cu(II)/TPMA was found to be reduced faster than Cu(II)/TPMA*3, which agrees with the lower standard reduction potential of the latter complex. Although less Cu(I)/TPMA*3 activators were generated during the irradiation processes, the higher $K_{ATRP}$ of this catalyst provided a much faster polymerization rate. At the same time, the presence of a higher [Cu(II)/TPMA*3], relative to the [Cu(I)/TPMA*3] allowed for more efficient deactivation and hence better polymerization control.

The reaction conditions used to synthesize molecular bottlebrushes are summarized in Table 3 of the Experimental Examples below. Poly(2-bromoisobutyryloxyethyl methacrylate) (PBiBEM) with a degree of polymerization equal to 56 or 370 were used as multifunctional backbones of different lengths to enable synthesis of star-like structures or molecular bottlebrushes with cylindrical conformations, respectively. Moreover, different degrees of polymerization were targeted, and both catalysts Cu/TPMA and Cu/TPMA*3 were tested. The grafting densities of final products were quantified by side-chain cleavage in which PBA side chains were cleaved via solvolysis and analyzed via GPC to measure the molecular weights. Grafting density influences unique properties, such as the high persistence lengths, thanks to steric interactions between side chains. It was determined that effective control over the polymerization was achieved when 150 ppm of Cu/TPMA was used to prepare PBA brushes with short side chains, initial molar ratio of monomer to initiator=50. A shorter backbone (PBiBEM$_{56}$) was initially used to prepare molecular brushes with star-like conformations, run TPMA-S-S, Table 5 of the Experimental Examples below. Effective polymerization control was supported by the clean shift of GPC traces with very little identifiable inter-brush coupling as a shoulder at higher molecular weights (see FIG. 14). Conversion of 93% and grafting density of 83% were determined after 3 days of reaction. Additionally, a longer backbone (PBiBEM$_{370}$) was used to prepare molecular brushes under similar conditions (TPMA-B-S, Table 5). In this context, a lower energy density of irradiation was initially used, 2.1 mW/cm$^2$ instead of 4.9 mW/cm$^2$, but the polymerization was rather slow, reaching only 18% conversion after 45 hours (FIG. 14, panel a). The rate of polymerization was increased to a similar level as in TPMA-S-S after switching the irradiation energy density to 4.9 mW/cm$^2$. A similar high grafting density of 82% was obtained in the final product (see FIG. 15). In both polymerizations, although some inter-brush coupling could be identified as shouldering in the GPC traces, no macroscopic gelation was found even at the high conversion (>90%).

Cu/TPMA, however, was not able to achieve a fast rate of polymerization in the preparation of PBA brushes with longer side chains, initial molar ratio of monomer to initiator=200 (run TPMA-S-L in Table 5). As a result of the dilution of the initiator, the polymerization rate, $k_p$=0.020 h$^{-1}$ was much lower than in the previous TPMA-S-S reaction with target DP=50, $k_p$=0.040 h$^{-1}$. On the other hand, polymerization control was very good, with grafting density as high as 93% and dispersity of the side chains as low as 1.11. This drop in reaction rate was also observed in the model reaction with the small molecule initiator, indicating that it is not a negative feature of the growth of longer side chains; instead, the slow rate arises from the relatively low reactivity of the catalyst. In a subsequent experiment targeting both long backbone and long side chains (run TPMA-B-L in Table 5) a lower amount of copper catalyst (50 ppm instead of 150 ppm) was used to increase the rate of polymerization, as observed for the model reactions (entries 3 and 5 in Table 4). Although this effectively increased the rate, $k_p^{app}$=0.071 h$^{-1}$ vs $k_p^{app}$=0.020 h$^{-1}$, the grafting density of the produced brush polymer dropped significantly, to 52%. The cleaved side chains had a relatively low dispersity, Ð=1.21. This observation may, for example, be attributed to the factor that the uneven growth of the initial side chains hindered access to approximately 50% of the initiating sites, which suggested that more stringent polymerization control is needed to provide well defined molecular bottlebrushes. In short, Cu/TPMA could not achieve both relatively fast polymerization rate and sufficient polymerization control for effective preparation of molecular bottlebrushes under PhotoATRP conditions.

As seen for the EBiB-initiated system (linear polymer), a more active catalyst can significantly improve the polymerization outcome. Indeed, the polymerization rate of PBA bottlebrushes increased 6 fold when the ligand was changed from TPMA to TPMA*3 (TPMA*3-S-L, $k_p^{app}$=0.13 h$^{-1}$, Table 5). Interestingly, the amount of ligand could be decreased from 6 equiv. to 2 equiv., with respect to CuBr$_2$, without affecting the polymerization rate, TPMA*3-2 eq, $k_p^{app}$=0.14 h$^{-1}$, Table 5. Polymerization remained well controlled with no macroscopic gelation, high grafting density of 86%, and low dispersity=1.12 for the cleaved side chains.

Therefore, utilization of a relatively highly active catalyst is desirable to achieve both fast reaction rates and good polymerization control for the synthesis of molecular bottlebrushes via PhotoATRP. PhotoATRP was further used to prepare functional bottlebrushes with thermoresponsive or pH-responsive properties.

In that regard, the Cu/TPMA*3 catalyst was used for the polymerization of molecular bottlebrushes based on thermoresponsive di(ethylene glycol) ethyl ether acrylate (EEO$_2$A) and pH-responsive acrylic acid (prepared from the precursor tert-butyl acrylate (tBA). Polymerization conditions; [monomer]:[BiBEM]: [CuBr$_2$]:[TPMA*3]=100:1:0.03:0.06, DP of PBiBEM: 370, irradiation: λ=360 nm, energy density=4.9 mW/cm$^2$, temperature: 25° C., 16 vol. % DMF, 64% anisole. GPC traces in FIG. 16 clearly showed a shift to high molecular weight, with very little inter-brush coupling even when monomer conversion exceeded 50%. As expected, experimental molecular weights measured by GPC, calibrated with linear polystyrene standards, were lower than theoretical values as a result of the more compact structure of molecular bottlebrushes.

A pH-responsive molecular bottlebrush with poly(acrylic acid) (PAA) side chains was prepared after hydrolyzing the precursor P(BiBEM-g-PtBA$_{49}$). The pH-responsiveness was evaluated from the change of zeta potential and particle size and with pH (measured by dynamic light scattering, DLS). The zeta potentials decreased with increasing pH, in agreement with the expected deprotonation of PAA. A sharp change in zeta potential was observed in correspondence of the pK$_a$ of PAA, pH≈4.5. Likewise, the hydrodynamic diameter (D$_h$) increased with pH, with an approximately 5-fold larger value observed for the fully deprotonated PAA. However, this change should only be evaluated qualitatively because the anisotropic structures of molecular bottlebrushes could introduce substantial errors the measurement of the hydrodynamic diameter (D$_h$).

The thermo-responsiveness of PEEO$_2$A brushes (P(BiBEM-g-PEEO$_2$A$_{67}$) were supported by the lower critical solution temperature (LCST), around 11° C., detected in 0.1 mg/L aqueous solution. The hydrodynamic radius continuously increased with temperature from 11° C., as a result of formation of hydrophobic clusters of molecular brushes.

The results of this study demonstrated that well controlled molecular bottlebrushes were synthesized by PhotoATRP via the "grafting-from" method. The moderately active Cu/TPMA provided good control for the synthesis of brushes with side chain lengths of DP~50. When DP=200 was targeted Cu/TPMA provided a slow but controlled reactions under higher catalyst loading (150 ppm), and a faster but uncontrolled reaction was observed at a loading of 50 ppm. The more highly active Cu/TPMA*3 ligand was found to be desirable to decrease reaction time while maintaining effective polymerization control with 150 ppm of catalyst. The desirability of a more active catalyst under PhotoATRP conditions was further supported by model reactions with a small molecule initiator to give linear homopolymers. Finally, the broad utility of the Cu/TPMA*3 catalyst was confirmed by the preparation of functional molecular bottlebrushes with pH- or thermos-responsiveness thereby demonstrating the versatility of the photopolymerization with active catalyst complexes.

In a number of embodiments hereof, relatively highly active catalyst complexes can be employed to prepare bottlebrush macromolecules under conditions where the ratio of the Cu$^I$/L complex to the Cu$^{II}$/L complex is maintained throughout the reaction by slow reduction of the low fraction of Cu$^{II}$/L complex formed as a result of termination reactions. This observation is exemplified by the regeneration of the Cu$^I$/L complex by the continuous CRT reaction and by the continuous reduction of the Cu$^{II}$/L complex in photoATRP.

EXPERIMENTAL EXAMPLES

Materials: n-Butyl acrylate (BA, ≥99%, Aldrich) were purified by passing the monomer through a column filled with basic alumina to remove the inhibitor. Copper(II) bromide (Cu$^{II}$Br$_2$, 98%, Acros), 4,4'-dinonyl-2,2'-bipyridyne (dNbpy, 97%, Aldrich), tris(2-dimethylaminoethyl) amine (Me$_6$TREN, ≥99%, Alfa Aesar) and solvents were used as received without further purification. The polymeric backbone PBiBEM$_{372}$ was synthesized as reported, for example, in Polymer 2016, 98, 481.

Characterization: Apparent number-average molecular weights (M$_n$) and dispersity (Đ) were measured by gel permeation chromatography (GPC). The SEC was conducted with a Waters 515 pump and Waters 2414 differential refractometer using PSS columns (SDV 10$^5$, 10$^3$, 500 Å) with THF as eluent at 35° C. and at a flow rate of 1 mL min$^{-1}$. Linear polystyrene standards were used for calibration. The conversion and composition of the polymer was measured via $^1$H NMR spectroscopy using a Bruker Advance 300 MHz NMR spectrometer with CDCl$_3$ as a solvent. The samples for the size characterization (length and width measurement for H25, Table 1) by AFM measurement were prepared by spin-casting from dilute solutions in chloroform (0.03 mg/mL). Imaging of individual molecules was performed utilizing the PeakForce QNM mode using a multimode AFM (Brüker) with a NanoScope V controller. Silicon probes with a resonance frequency of 50-90 Hz and a spring constant of ~0.4 N/m were used. In-house-developed computer software was used to analyze the AFM images for dimensions of adsorbed macromolecules. The length distribution and width distribution were measured using 1000 molecules and 50 molecules respectively. The weight fractions of coupled and uncoupled brushes were calculated by deconvolution of differential refractive index (dRI) vs elution volume (V$_e$), in Origin 9.0. The average hydrodynamic diameter of micelles was measured by dynamic light scattering (DLS) using a high performance zeta-sizer from Malvern Instruments, Ltd.

Typical Conditions for the Synthesis of poly(2-bromoisobutyryloxyethyl methacrylate-graft-poly(n-butyl acrylate) (P(BiBEM-g-PBA)) A 25 mL Schlenk flask was charged with PBiBEM$_{372}$ (100.0 mg, containing 358.4 µmol initiating sites), BA (2.6 mL, 0.018 mmol), anisole (8.2 mL), DMF (2.1 mL), CuBr$_2$ (3.3 mg, 0.015 mmol) and Me$_6$TREN (10.3 mg, 44.8 µmol). The solution was degassed by three freeze-pump-thaw cycles. During the final cycle, the flask was filled with nitrogen, and CuBr (4.3 mg, 0.030 mmol) was quickly added to the frozen reaction mixture. The flask was sealed, evacuated, and backfilled with nitrogen five times. After various reaction times, the polymerizations were stopped by opening the flask to air. The resulting polymer solution was purified by passing through a column of neutral alumina. Then, the polymer was precipitated by adding the solution to methanol. The precipitate was separated, washed with methanol, and dried under vacuum at room temperature for 24 h.

Side chain cleavage: P(BiBEM-g-PBA) (50 mg) isolated in the reaction of H25 was dissolved in THF (2 mL) and 1-butanol (99+%) (12 mL). Concentrated sulfuric acid (5 drops) was added, and the solution was heated at 100° C. for 5 days. Afterwards, the solvents were removed, and the residues were dissolved in THF (~3 ml) and passed through a basic alumina column. The molecular weight and dispersity of the cleaved linear polymer (cleaved side chains) were determined to be $M_{n,GPC,SC}$=6,320, Đ=1.07. Grafting density (Grafting density=$M_{n,BA}$*([BA]$_0$/[BiBEM]$_0$)*(Monomer conversion)/$M_{n,GPC,SC}$) of this bottlebrush sample is calculated to be 85%.

PhotoATRP reaction setup. The general procedure for the synthesis of the bottlebrush macromolecules is described below for the reaction of BA-TPMA-B (Table 4). A 25 mL Schlenk flask was charged with PBiBEM$_{372}$ (174.4 mg, containing 625.0 µmol initiating sites), BA (4.5 mL, 0.031 mmol), anisole (14.3 mL), DMF (3.6 mL), CuBr$_2$ (4.2 mg, 0.019 mmol) and TPMA (32.6 mg, 0.113 mmol). The solution was degassed by nitrogen bubbling for 20 minutes. Then the flask was sealed, frozen in liquid nitrogen, evacuated, and backfilled with nitrogen five times. After various reaction times, the polymerizations were stopped by opening the flask to air. The resulting polymer solution was purified by passing through a column of neutral alumina then precipitated by adding the solution to methanol. The precipitate was separated, washed with methanol, and dried under vacuum at Temperature: 25° C. for 24 h.

Side chain cleavage: Same procedure as above: Grafting density=$M_{n,BA}$*([BA]$_0$/[BiBEM]$_0$)*(Monomer conversion by NMR)/$M_{n,GPC,SC}$).

Purification of Poly[2-(2-bromoisobutyryl)ethyl methacrylate-graft-ethyl ether acrylate] (PBiBEM-g-PEEO$_2$A) The crude reaction mixture was diluted with dichloromethane then passed through a neutral alumina plug into a round bottom flask. Excess solvent was removed via rotary evaporation. The concentrated solution was added dropwise to a 30/70 (v/v %) cold water/methanol solution. The desired polymer precipitate was isolated via vacuum filtration and was dried overnight under vacuum.

Lower critical solution temperature (LCST) measurement PBiBEM-g-PEEO$_2$A was added to ultrapure deionized water and stirred for 2 hours. The resulting aqueous solution of PBiBEM-g-PEEO$_2$A (0.8 mg/L) was used to measure the LCST of the polymer in water through dynamic light scattering performed with a high-performance zetasizer from Malvern Instruments, with a measurement range of 3 to 25° C. The measurement was based on the Z-average and derived count rate values change over the range of temperatures.

Purification of Poly[2-(2-bromoisobutyryl)ethyl methacrylate-graft-tert-butyl acrylate] (PBiBEM-g-PtBA). The crude reaction mixture was diluted with dichloromethane then passed through a neutral alumina plug into a round bottom flask. Excess solvent was removed via rotary evaporation. The concentrated solution was added dropwise to a 30/70 (v/v %) cold water/methanol solution. The desired polymer precipitate was isolated via vacuum filtration and was dried overnight under vacuum.

Synthesis of Poly[2-(2-bromoisobutyryl)ethyl methacrylate-graft-acrylic acid](PBiBEM-g-PtBA). PBiBEM-g-PtBA, (0.48 g, assumed to contain 3.57 mmol of tBA functional groups) was loaded into a 50 mL round bottom flask equipped with a magnetic stir bar. The brush was then dissolved in dichloromethane and the reaction vessel was sealed with a rubber septum. A fivefold molar excess of CF$_3$COOH (1.37 mL, 17.85 mmol) was added dropwise while the mixture stirred. The reaction stirred at room temperature for 48 h. The precipitated PAA brush was isolated via vacuum filtration, washed with cold dichloromethane, and dried in a vacuum oven at room temperature overnight.

pH Responsiveness Testing Solid PBiBEM-g-PAA was added to ultrapure deionized water and stirred at 50° C. for 24 hours. The resulting 5 wt % stock solution was partitioned into smaller portions, where the pH was altered through additions of 1M NaOH, 1M HCl, or ultrapure water. The 4.3 wt % stock solutions were within a pH range of 3 to 10, confirmed by measurement via a Thermo Scientific Orion Versa Star Benchtop pH Meter.

The average hydrodynamic diameter of pH responsive brushes was measured through dynamic light scattering (DLS) using a high performance zeta-sizer from Malvern Instruments, Ltd at a temperature of 25° C. and scattering angle of 173°. Zeta potential measurements were obtained using the same instrument.

Hydrogen Transfer using Acetonitrile: Grafting from of polymer brushes using MeCN resulted in initiation of new chains as the grafting from polymerization of nBA (Table 4, FIG. 4). MeCN encouraged hydrogen atom transfer, which aided in limiting coupling of brushes at high conversions but initiated new chains as polymerizations ran to high conversion.

TABLE 2

| Reaction ID | Solv. A | Solv. B | [BA]:[BiBEM]: [CuBr]:[CuBr$_2$]:[Me6TREN] |
|---|---|---|---|
| H80 | DMF (16%) | Anisole (64%) | 50:1:0.083:0.042:0.138 |
| H80ACN0.16 | CH$_3$CN (16%) | Anisole (64%) | 50:1:0.083:0.042:0.138 |
| H80ACN0.51 | CH$_3$CN (51%) | Anisole (29%) | 50:1:0.083:0.042:0.138 |

All reactions conducted at 80° C., kinetics taken over 30 h.

Hydrogen Transfer using Triphenylmethane: Triphenylmethane (TPM) was employed as a substitute for MeCN, as the radical formed after hydrogen atom transfer (HAT) will be stabilized by the three aromatic rings. Thus, HAT from TMP should be more favorable than abstraction from MeCN. The bulky structure of TPM also makes initiation of new chains more difficult, as the compound is more likely to dimerize after HAT rather than initiate new chains.

TABLE 3

| Reaction ID | Solv. A | Solv. B | [BA]:[BiBEM]: [CuBr]:[CuBr$_2$]: [Me6TREN]:[TPM] |
|---|---|---|---|
| H80TPM5 | DMF (16%) | Anisole (64%) | 50:1:0.083:0.042:0.138:5 |
| H80TPM3 | DMF (16%) | Anisole (64%) | 50:1:0.083:0.042:0.138:5 |
| H80TPM | DMF (16%) | Anisole (64%) | 50:1:0.083:0.042:0.138:1 |

Conducted at 80° C., kinetics taken until gelation.

TMP was initially employed at a five-fold excess to compensate for the high concentration of MeCN in previous polymerizations (Table 2). Polymerization peaked at 44% conversion after 30 h, which was considerably lower than attempts utilizing MeCN (see FIG. 4, panels a and b). Additional tailing is observed as H80TPM5 reached higher conversion. Very minimal coupling is observed, but initiation of new chains appears to still be present. Decreasing the equivalents of TPM from 5 to 3 resulted in a slight increase in rate of propagation, reaching 80% conversion over 11.5 hours. There was slightly less initiation of new chains as the equivalents was decreased, however suppression of coupling was not as effective as H80TPM5 (see FIG. 17).

Decreasing the equivalents of TPM from 5 to 1 showed a much faster rate of propagation with very good control according to the first order kinetic plot. Molecular weight distributions are broad, but Gaussian. The shouldering present in the backbone is overshadowed by growth of the brush, which could be attributed to RT via coupling. Tailing is still prevalent, but not as extreme as is observed in H80TPM5 or H80TPM3.

An accurate assessment of the transfer mechanism was conducted using a comparison between a free radical polymerization of MA under the same conditions with no TPM against an FRP with 40 equivalents of TPM. Similar to what was observed in ATRP, the addition of TPM decreased the rate of propagation substantially.

PhotoATRP of Butyl Acrylate and Formation of Bottlebrush Macromolecules

A.) Initial Model Study Using Low MW Initiator

TABLE 4

| reaction entry | [BA]:[EBiB]:[CuBr$_2$]:[L] | ligand | ppm | $k_{p,0}^{b}$ (h$^{-1}$) | time (h) | monomer conversion | M$_{n,app}$ | M$_{n,th}$ | Đ |
|---|---|---|---|---|---|---|---|---|---|
| Cu/TPMA-600 ppm | 200:1:0.12:0.72 | TPMA | 600 | 0.015 | 115 | 0.70 | 15.7 | 18.0 | 1.08 |
| Cu/TPMA-150 ppm | 200:1:0.03:0.18 | TPMA | 150 | 0.021 | 16 | 0.38 | 10.1 | 9.7 | 1.31 |
| Cu/TPMA-25 ppm | 200:1:0.005:0.03 | TPMA | 25 | 0.096 | 16 | 0.82 | 20.9 | 21.0 | 1.70 |
| Cu/TPMA*3-150 ppm | 200:1:0.03:0.06 | TPMA*3 | 150 | 0.066 | 17 | 0.71 | 17.4 | 18.1 | 1.10 |
| Cu/TPMA*3-25 ppm | 200:1:0.005:0.01 | TPMA*3 | 25 | 0.16 | 17 | 0.91 | 22.5 | 23.4 | 1.23 |

$^{a}$ Ligand: TPMA = tris(2-pyridylmethyl)amine; TPMA*3 = tris([(4-methoxy-2,5-dimethyl)-2-pyridyl]methyl)amine. Solvent content: 16 vol. % DMF, 64 vol. % anisole. Temperature: room temperature. Wavelength of irradiation: 360 nm, 4.9 mW/cm$^2$
$^{b}$ initial rate of polymerization was measured without including the induction period.

B.) Synthesis of PBA Bottlebrush Macromolecules

TABLE 5

| reaction entry | DP Backbone | [BA]:[BiBEM]:[CuBr$_2$]:[L] | ligand | light intensity (mW/cm$^2$) | time (h) | monomer conversion (%) | $k_p$ (h$^{-1}$) | grafting density (%) |
|---|---|---|---|---|---|---|---|---|
| TPMA-S-S | 56 | 50:1:0.03:0.18 | TPMA | 4.9 | 72 | 93 | 0.040 | 83 |
| TPMA-B-S | 370 | 50:1:0.03:0.18 | TPMA | 2.1 to 4.9 $^b$ | 111 $^b$ | 93 | 0.038 (0.0045)$^c$ | 82 |
| TPMA-S-L | 56 | 200:1:0.03:0.18 | TPMA | 4.9 | 57 | 67 | 0.020 | 93 |
| TPMA-B-L | 370 | 200:1:0.01:0.06 | TPMA | 4.9 | 14 | 60 | 0.071 | 52 |
| TPMA*3-S-L | 56 | 200:1:0.03:0.18 | TPMA*3 | 4.9 | 5 | 50 | 0.13 | n/d |
| TPMA*3-S-L-2eq | 56 | 200:1:0.03:0.06 | TPMA*3 | 4.9 | 7 | 61 | 0.14 | 86 |

Reaction conditions: [BA]:[BiBEM]:[CuBr$_2$]:[TPMA] = 50:1:0.03:0.18, DP of PBiBEM: 370, irradiation: λ = 360 nm, energy density was 2.1 mW/cm$^2$ prior to 45$^{th}$ hour and switched to 4.9 mW/cm$^2$ afterward, temperature: 25° C..
$^a$ Solvent content: 16 vol. % DMF, 64 vol. % anisole. Multifunctional macroinitiator (backbone): poly(2-bromoisobutyryloxyethyl methacrylate (PBiBEM). Temperature: 25°C.. Wavelength of irradiation: 360 nm. TPMA-B/S-S/L = reaction run with TPMA as the ligand to prepare brush/star-like with short/long side chains.
$^b$ The reaction was longer because of the initial low rate of polymerization. The energy density of irradiation was increased from 2.1 mW/cm$^2$ to 4.9 mW/cm$^2$ by changing the lamp at 45$^{th}$ hour.
$^c$ before changing lamp, k$_p$ = 0.0045 h$^{-1}$; after changing the lamp, k$_p$ = 0.038 h$^{-1}$.
$^d$ did not determine.

TABLE 6

| reaction entry | [Monomer]:[BiBEM]:[CuBr$_2$]:[TPMA*3] | Time (h) | monomer conversion (%) | DP$_{SC}^{b}$ | M$_{n,theory}^{c}$ | M$_{n,app}^{d}$ | M$_w$/M$_n^{d}$ |
|---|---|---|---|---|---|---|---|
| PtBA brush | 100:1:0.03:0.06 | 4.5 | 49 | 49 | 2,320,000 | 345,000 | 1.26 |
| PEEO$_2$A brush | 100:1:0.03:0.06 | 24.0 | 67 | 67 | 4,660,000 | 566,000 | 1.14 |

$^a$ TPMA*3 = tris([(4-methoxy-2,5-dimethyl)-2-pyridyl]methyl)amine. Solvent content: 16 vol. % DMF, 64 vol. % anisole. The multifunctional macroinitiator (backbone): poly (2-bromoisobutyryloxyethyl methacrylate (PBiBEM), DP = 370. Temperature: 25° C. irradiation by 360 nm at 4.9 mW/cm$^2$.
$^b$ calculated based on the monomer conversion and the initial molar ratio between monomer and initiator.
$^c$ Theoretical molecular weight, calculated based on molecular parameters (DP of backbone, DP of side chains and the molecular weight of the side chain monomer unit.
$^d$ Apparent molecular weight and dispersity, determined by GPC using linear PS standards.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method of carrying out an atom transfer radical polymerization wherein intermolecular crosslinking can occur, comprising: controlling an amount of crosslinking in a reaction which is homogeneous by carrying out the reaction under conditions wherein catalytic radical termination, in which a chain-end radical coordinates with an active catalyst complex $L/Mt^z$, is favored over radical termination, in which chain-end radicals combine, wherein Mt is a transition metal having two stable oxidation states, z and z+1 differ by 1, and L is a ligand.

2. The method of claim 1 wherein the active catalyst complex has a $K_{ATRP}$ greater than $1.0 \times 10^{-5}$.

3. The method of claim 1 wherein the active catalyst complex has a $K_{ATRP}$ greater than $1.0 \times 10^{-4}$.

4. The method of claim 1 wherein the transition metal is selected from the groups consisting of Cu, Ti, Mo, Re, Fe, Ru, Os, Rh, Co, Ni, and Pd.

5. The method of claim 4 wherein the transition metal is Cu.

6. The method of claim 2 wherein the active catalyst complex is slowly activated and reactivated in the presence of a reducing agent and a hydrogen transfer agent.

7. The method of claim 6 wherein the concentration of the $L/Mt^z$ complex is lower than 10% of the higher oxidation state catalyst complex.

8. The method of claim 6 wherein the reducing agent is light and the atom transfer radical polymerization is a photoATRP.

9. The method of claim 8 wherein the concentration of the $L/Mt^z$ complex is lower than 10% of the higher oxidation state catalyst complex.

10. The method of claim 6 wherein the concentration of the active catalyst complex in the lower oxidation state in a reaction medium of the reaction is lower than 150 ppm.

11. The method of claim 2 wherein a polymer formed via the atom transfer radical polymerization has a polydispersity Đ lower than 1.25 and a measured number average molecular weight within 7.5% of a theoretical molecular weight.

12. The method of claim 2 wherein conversion of monomer in the atom transfer radical polymerization is greater than 60%.

13. The method of claim 12 wherein the polymerization time is less than 30 hours.

14. The method of claim 2 wherein the atom transfer radical polymerization is conducted at a temperature less than 80° C.

15. The method of claim 2 wherein the concentration of the active catalyst complex is less than 600 ppm.

16. The method of claim 2 wherein the atom transfer radical polymerization is conducted in the presence of at least one additive that undergoes hydrogen atom transfer.

17. The method of claim 16, wherein the at least one additive is a cosolvent or an agent that forms stable radicals.

18. The method of claim 1 wherein the atom transfer radical polymerization is used to prepare star macromolecules, graft macromolecules, or bottlebrush macromolecules.

19. The method of claim 1 wherein radically polymerizable monomers polymerized in the atom transfer radical polymerization comprise acrylates.

20. A method for the synthesis of linear polymers by atom transfer radical polymerization, comprising: conducting the synthesis in the presence of an active catalyst complex including $L/Mt^z$, wherein Mt is a transition metal with two stable oxidation states, z and z+1, which differ by 1, and L is a ligand, the active catalyst complex having a $K_{ATRP}$ greater than $1.0 \times 10^{-5}$ and slowly activating and reactivating the active catalyst complex in the presence of a reducing agent, wherein the concentration of $L/Mt^z$ is lower than 10% of the added higher oxidation state catalyst complex and the catalyst concentration in a reaction medium of the atom transfer radical polymerization is lower than 150 ppm.

21. The method of claim 19 wherein Mt is Cu and z is 1.

* * * * *